(12) United States Patent
Burns et al.

(10) Patent No.: US 12,417,286 B2
(45) Date of Patent: Sep. 16, 2025

(54) AUTOMATED ATTACK CHAIN FOLLOWING BY A THREAT ANALYSIS PLATFORM

(71) Applicant: Splunk Inc., San Francisco, CA (US)

(72) Inventors: Bryan Burns, Portland, OR (US); Michael Horn, San Carlos, CA (US); Steven Thomas Jackson, Anchorage, AK (US); William Metcalf, Concordia, KS (US); Jason Williams, Firestone, CO (US); Gregory Lee Wittel, Mountain View, CA (US)

(73) Assignee: SPLUNK Inc., San Francisco, CA (US)

( * ) Notice: Subject to any disclaimer, the term of this patent is extended or adjusted under 35 U.S.C. 154(b) by 142 days.

(21) Appl. No.: 18/162,649

(22) Filed: Jan. 31, 2023

(65) Prior Publication Data

US 2024/0338447 A1    Oct. 10, 2024

(51) Int. Cl.
  G06F 21/56    (2013.01)
  G06F 21/53    (2013.01)

(52) U.S. Cl.
  CPC ............ G06F 21/566 (2013.01); G06F 21/53 (2013.01); G06F 21/563 (2013.01); *G06F 2221/033* (2013.01)

(58) Field of Classification Search
  CPC ...... G06F 21/566; G06F 21/53; G06F 21/563; G06F 2221/033
  See application file for complete search history.

(56) References Cited

U.S. PATENT DOCUMENTS

| | | | |
|---|---|---|---|
| 7,376,842 B1 * | 5/2008 | Hursey | G06F 21/563 709/224 |
| 7,937,344 B2 | 5/2011 | Baum et al. | |

(Continued)

FOREIGN PATENT DOCUMENTS

| | | |
|---|---|---|
| CN | 101369280 A | 2/2009 |
| RU | 2622870 C2 | 6/2017 |
| WO | 2022147339 A1 | 7/2022 |

OTHER PUBLICATIONS

Campobasso et al., "CARONTE: Crawling Adversarial Resources Over Non-Trusted, High-Profile Environments", IEEE European Symposium on Security and Privacy Workshops, Jun. 2019, pp. 433-442.

(Continued)

*Primary Examiner* — Trong H Nguyen
(74) *Attorney, Agent, or Firm* — Kilpatrick Townsend & Stockton LLP

(57) ABSTRACT

Techniques are described for providing a threat analysis platform capable of automating actions performed to analyze security-related threats affecting IT environments. Users or applications can submit objects (e.g., URLs, files, etc.) for analysis by the threat analysis platform. Once submitted, the threat analysis platform routes the objects to dedicated engines that can perform static and dynamic analysis processes to determine a likelihood that an object is associated with malicious activity such as phishing attacks, malware, or other types of security threats. The automated actions performed by the threat analysis platform can include, for example, navigating to submitted URLs and recording activity related to accessing the corresponding resource, analyzing files and documents by extracting text and metadata, extracting and emulating execution of embedded macro source code, performing optical character recognition (OCR) and other types of image analysis, submitting objects to third-party security services for analysis, among many other possible actions.

20 Claims, 13 Drawing Sheets

(56) References Cited

U.S. PATENT DOCUMENTS

| | | | |
|---|---|---|---|
| 8,112,425 | B2 | 2/2012 | Baum et al. |
| 8,751,529 | B2 | 6/2014 | Zhang et al. |
| 8,788,525 | B2 | 7/2014 | Neels et al. |
| 9,215,240 | B2 | 12/2015 | Merza et al. |
| 9,286,413 | B1 | 3/2016 | Coates et al. |
| 9,319,384 | B2 | 4/2016 | Yan et al. |
| 9,438,613 | B1* | 9/2016 | Paithane ............ H04L 63/1425 |
| 9,501,643 | B1 | 11/2016 | Zakorzhevsky et al. |
| 10,127,258 | B2 | 11/2018 | Lamas et al. |
| 10,904,286 | B1 | 1/2021 | Liu |
| 11,222,112 | B1 | 1/2022 | Satpathy et al. |
| 11,444,978 | B1 | 9/2022 | Liao et al. |
| 11,496,510 | B1 | 11/2022 | Orhan |
| 2002/0103783 | A1* | 8/2002 | Muhlestein ........... G06F 21/562 |
| 2005/0120292 | A1 | 6/2005 | Suzuki |
| 2008/0263659 | A1* | 10/2008 | Alme ...................... G06F 21/56 |
| | | | 726/22 |
| 2010/0235918 | A1 | 9/2010 | Mizrahi et al. |
| 2013/0160127 | A1 | 6/2013 | Jeong et al. |
| 2014/0033307 | A1 | 1/2014 | Schmidtler |
| 2014/0359760 | A1 | 12/2014 | Gupta et al. |
| 2017/0357813 | A1* | 12/2017 | Petersen ............... G06F 21/566 |
| 2018/0025012 | A1 | 1/2018 | Cao et al. |
| 2018/0115573 | A1 | 4/2018 | Kuo et al. |
| 2018/0189073 | A1* | 7/2018 | Larabie-Belanger ..... G06F 8/38 |
| 2019/0044964 | A1 | 2/2019 | Chari et al. |
| 2019/0098106 | A1 | 3/2019 | Mungel et al. |
| 2020/0252428 | A1 | 8/2020 | Gardezi et al. |
| 2021/0019403 | A1 | 1/2021 | Mehta et al. |
| 2021/0099485 | A1 | 4/2021 | Lancioni et al. |
| 2021/0203692 | A1 | 7/2021 | Nunes et al. |
| 2021/0297428 | A1 | 9/2021 | Hatekar et al. |
| 2022/0027428 | A1 | 1/2022 | Sutton |
| 2022/0038424 | A1* | 2/2022 | Liu ..................... H04L 63/1416 |
| 2023/0065787 | A1 | 3/2023 | Akhter et al. |
| 2023/0114821 | A1* | 4/2023 | Thomas ............. H04L 63/1433 |
| | | | 726/23 |
| 2023/0229768 | A1 | 7/2023 | Snyder |
| 2024/0195836 | A1 | 6/2024 | Gardezi et al. |

OTHER PUBLICATIONS

International Search Report and Written Opinion, PCT App. No. PCT/US2024/013577, Sep. 3, 2024, 19 pages.

Kharraz et al., "Optical Delusions: A Study of Malicious QR Codes in the Wild", 44th Annual IEEE/IFIP International Conference on Dependable Systems and Networks, Jun. 2014, pp. 192-203.

Singh et al., "MalCrawler: A Crawler for Seeking and Crawling Malicious Websites", Springer International Publishing AG, 2017, 14 pages.

Splunk Enterprise 8.0.0 Overview, available online, retrieved May 20, 2020 from docs.splunk.com.

Splunk Cloud 8.0.2004 User Manual, available online, retrieved May 20, 2020 from docs.splunk.com.

Splunk Quick Reference Guide, updated 2019, available online at https://www.splunk.com/pdfs/solution-guides/splunk-quick-reference-guide.pdf, retrieved May 20, 2020.

Carasso, David, "Exploring Splunk," published by CITO Research, New York, NY, Apr. 2012.

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

TwinWave homepage, retrieved via Internet: http://web.archive.org/web/20221202221828/https:/www.twinwave.io/ on Jun. 13, 2023, 6 pages.

TwinWave Platform, retrieved via Internet: http://web.archive.org/web/20221202231056/https://www.twinwave.io/platform/ on Jun. 13, 2023, 13 pages.

TwinWave Use Cases, retrieved via Internet: http:/web.archive.org/web/20221202224717/https://www.twinwave.io/use-cases/ on Jun. 13, 2023, 8 pages.

URL and website scanner—urlscan.io, retrieved via Internet: http://web.archive.org/web/20230131200457/https://urlscan.io/ on Jun. 13, 2023, 2 pages.

"Non-Final Office Action", for U.S. Appl. No. 18/162,645 mailed Jan. 3, 2025, 13 pages.

U.S. Appl. No. 18/162,640, "Non-Final Office Action", Mar. 5, 2025, 12 pages.

U.S. Appl. No. 18/162,645, "Notice of Allowance", Apr. 15, 2025, 6 pages.

Fadheel, et al., "On Feature Selection for the Prediction of Phishing Websites", 2017 Institute of Electrical and Electronics Engineers15th Intl Conf on Dependable, Autonomic and Secure Computing, 15th Intl Conf on Pervasive Intelligence and Computing, Nov. 6, 2017, pp. 871-876.

Sonmez, et al., "Phishing Web Sites Features Classification Based on Extreme Learning Machine", 6th International Symposium on Digital Forensic and Security, Institute of Electrical and Electronics Engineers, Mar. 22, 2018, pp. 1-5.

Yang, et al., "Phishing Website Detection Based on Multidimensional Features Driven by Deep Learning", Institute of Electrical and Electronics Engineers, vol. 7, Jan. 11, 2019, p. 15196-15209.

U.S. Appl. No. 18/162,640, "Notice of Allowance", Jul. 30, 2025, 10 pages.

Mao, et al., "Detecting Phishing Websites via Aggregation Analysis of p. Layouts", Procedia Computer Science, vol. 129, Jan. 1, 2018, pp. 224-230.

Zhang, et al., "Web Phishing Detection Based on p. Spatial Layout Similarity", Informatica, vol. 37, No. 3, 2013, pp. 231-244.

* cited by examiner

RESULTS INTERFACE 800

ANALYSIS  Recent  Search  All Jobs  Search Forensics                                    user@example.com Mime Type    application/vnd.openxmlformats-officedocument.wordproces...

Detections (14)  Network (2)  System (1)  Strings & Configs (870)  Images (4)

dridex_2020-01-28.doc

⌄ Static File Analysis        0
⌄ Virus Total                100
⌄ ClamAV                      0
⌄ YARA                        0
⌄ Static Doc Analysis         0
⌄ Cuckoo Sandbox (win7)       0
⌄ Cuckoo Sandbox (win10)      0

Extracted Configs (0)

All Strings (870)                                                    ⌄

Word Processing 2019

This document was created in a later version of the application with security updates.
To view this content, please click "Enable Editing" and then click "Enable Content".

dridex_2020-01-28.doc

⌄ Static File Analysis        0
⌄ Virus Total                100
⌄ ClamAV                     100
⌄ YARA                       100
⌄ Static Doc Analysis        100
⌄ Cuckoo Sandbox (win7)      100
⌄ Cuckoo Sandbox (win10)     100

VBA Macros (1)                                                       ⌄

Attribute VB_Name = "ThisDocument"
Attribute VB_Base = "1Normal.ThisDocument"
Attribute VB_GlobalNameSpace = False
Attribute VB_Creatable = False
Attribute VB_PredeclaredId = True
Attribute VB_Exposed = True
Attribute VB_TemplateDrived = True
Attribute VB_Customizable = True https://fbaroslo.example.com/phone...

⌄ Static File Analysis        0
⌄ Virus Total                100

7FA4AC612014C.cmd

Attribute VB_Name = "modNormalTheme"
Public Function LBR_For_Mercury(At_JDE)

Dim L
Dim B
Dim R
                                                          ⌄ Expand ⌄

⌄ Static File Analysis        0
⌄ Virus Total                 0
⌄ ClamAV                      0
⌄ Yara                        0

OCR Extracted Strings (1)                                            ⌄

OBTAINING, BY A WEB ANALYZER ENGINE OF A THREAT ANALYSIS PLATFORM, A FIRST UNIFORM RESOURCE LINK (URL) TO BE ANALYZED BY THE WEB ANALYZER ENGINE FOR POTENTIAL SECURITY THREATS
1002

↓

CAUSING A WEB BROWSER TO NAVIGATE TO A FIRST RESOURCE LOCATED AT THE FIRST URL
1004

↓

IDENTIFYING A PLURALITY OF ARTIFACTS ASSOCIATED WITH THE FIRST RESOURCE, WHEREIN THE PLURALITY OF ARTIFACTS INCLUDES A PLURALITY OF INTERACTIVE INTERFACE ELEMENTS
1006

↓

ASSIGNING, TO THE PLURALITY OF INTERACTIVE INTERFACE ELEMENTS, A PLURALITY OF INTERACTION SCORES, WHEREIN EACH INTERACTION SCORE OF THE PLURALITY OF INTERACTION SCORES INDICATES A PREDICTED RELEVANCE OF A RESPECTIVE INTERACTIVE INTERFACE ELEMENT OF THE PLURALITY OF INTERACTIVE INTERFACE ELEMENTS TO A SECURITY INVESTIGATION
1008

↓

CAUSING THE WEB BROWSER TO INTERACT WITH ONE OF THE PLURALITY OF INTERACTIVE INTERFACE ELEMENTS BASED ON A RANKING OF THE PLURALITY INTERACTION SCORES
1010

```
┌─────────────────────────────────────────────────────────────────────────┐
│ OBTAINING, BY A FILE ANALYSIS ENGINE OF A THREAT ANALYSIS PLATFORM, A  │
│ FILE TO BE ANALYZED FOR ONE OR MORE SECURITY THREATS ASSOCIATED WITH    │
│ THE FILE                                                                │
│                                 1102                                    │
└─────────────────────────────────────────────────────────────────────────┘
                                   │
                                   ▼
┌─────────────────────────────────────────────────────────────────────────┐
│                       DETERMINING A TYPE OF THE FILE                    │
│                                 1104                                    │
└─────────────────────────────────────────────────────────────────────────┘
                                   │
                                   ▼
┌─────────────────────────────────────────────────────────────────────────┐
│ IDENTIFYING, BASED ON THE TYPE OF THE FILE, A PLURALITY OF FILE TYPE-   │
│ SPECIFIC ACTIONS TO BE USED TO EXTRACT A PLURALITY OF ARTIFACTS FROM    │
│ THE FILE, WHEREIN THE PLURALITY OF FILE TYPE-SPECIFIC ACTIONS INCLUDES  │
│ EXTRACTING MACRO CODE OR ENCODED INSTRUCTIONS FROM THE FILE             │
│                                 1106                                    │
└─────────────────────────────────────────────────────────────────────────┘
                                   │
                                   ▼
┌─────────────────────────────────────────────────────────────────────────┐
│ EMULATING EXECUTION OF AT LEAST A PORTION OF THE MACRO CODE OR ENCODED │
│ INSTRUCTIONS TO OBTAIN AN ARTIFACT OF THE PLURALITY OF ARTIFACTS        │
│                                 1108                                    │
└─────────────────────────────────────────────────────────────────────────┘
                                   │
                                   ▼
┌─────────────────────────────────────────────────────────────────────────┐
│ ASSIGNING, BASED ON A RULE SET, RESPECTIVE RISK SCORES TO TWO OR MORE  │
│ ARTIFACTS OF THE PLURALITY OF ARTIFACTS INCLUDING THE ARTIFACT OBTAINED │
│ BASED ON EMULATING EXECUTION OF AT LEAST A PORTION OF THE MACRO CODE   │
│ OR ENCODED INSTRUCTIONS                                                 │
│                                 1110                                    │
└─────────────────────────────────────────────────────────────────────────┘
                                   │
                                   ▼
┌─────────────────────────────────────────────────────────────────────────┐
│ ASSIGNING, BASED ON THE RESPECTIVE RISK SCORES, AN AGGREGATED RISK     │
│ SCORE FOR THE FILE                                                      │
│                                 1112                                    │
└─────────────────────────────────────────────────────────────────────────┘
```

```
┌─────────────────────────────────────────────────────────────────────┐
│ OBTAINING, BY A THREAT ANALYSIS PLATFORM INCLUDING A PLURALITY OF   │
│ ANALYSIS ENGINES, A FIRST OBJECT TO BE INVESTIGATED FOR             │
│ SECURITY-RELATED THREATS, WHEREIN THE FIRST OBJECT IS ONE OF:       │
│ A UNIFORM RESOURCE LOCATOR (URL) OR A FILE                          │
│                              1202                                    │
└─────────────────────────────────────────────────────────────────────┘
                                  │
                                  ▼
┌─────────────────────────────────────────────────────────────────────┐
│ PROVIDING, BASED ON A TYPE OF THE OBJECT, THE FIRST OBJECT TO A     │
│ FIRST ANALYSIS ENGINE OF THE PLURALITY OF ANALYSIS ENGINES,         │
│ WHEREIN THE FIRST ANALYSIS ENGINE IDENTIFIES A SECOND OBJECT        │
│ DURING ANALYSIS OF THE FIRST OBJECT, AND WHEREIN THE FIRST OBJECT   │
│ IS ASSOCIATED WITH A FIRST OBJECT TYPE AND THE SECOND OBJECT IS     │
│ ASSOCIATED WITH A SECOND OBJECT TYPE THAT IS DIFFERENT FROM THE     │
│ FIRST OBJECT TYPE                                                    │
│                              1204                                    │
└─────────────────────────────────────────────────────────────────────┘
                                  │
                                  ▼
┌─────────────────────────────────────────────────────────────────────┐
│ DETERMINING, BASED ON A RULE SET IDENTIFYING PATTERNS OF OBJECT     │
│ TYPES ASSOCIATED WITH SECURITY THREATS, TO INVESTIGATE THE          │
│ SECOND OBJECT                                                        │
│                              1206                                    │
└─────────────────────────────────────────────────────────────────────┘
                                  │
                                  ▼
┌─────────────────────────────────────────────────────────────────────┐
│ PROVIDING THE SECOND OBJECT TO A SECOND ANALYSIS ENGINE OF THE      │
│ PLURALITY OF ANALYSIS ENGINES                                        │
│                              1208                                    │
└─────────────────────────────────────────────────────────────────────┘
```

FIG. 12

AUTOMATED ATTACK CHAIN FOLLOWING BY A THREAT ANALYSIS PLATFORM

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Information technology (IT) environments remain susceptible to a wide variety of security threats including, for example, malware threats, credential phishing, and the like. Malware can generally include any type of software or other mechanisms (e.g., viruses, worms, trojans, ransomware, etc.) designed to damage or disrupt the computer systems within an IT environment. Credential phishing refers to a type of security threat in which users within an IT environment are tricked into revealing sensitive information such as, e.g., login credentials, financial information, or other sensitive data. Many businesses and other entities use teams of security analysts to try to prevent these and other types of threats by employing security software, analyzing detected threats, and performing mitigating actions responsive to detected threats.

BRIEF DESCRIPTION OF THE DRAWINGS

Illustrative examples are described in detail below with reference to the following figures:

FIG. 8 illustrates an example user interface displaying results information generated by the threat analysis platform involving the extraction and emulation of macro code or encoded instructions embedded in a document according to some examples.

FIG. 10 is a flow diagram illustrating operations of a method in which a threat analysis platform uses a web analyzer engine to analyze a provided URL and associated resources for security-related threats an according to some examples.

FIG. 11 is a flow diagram illustrating operations of a method in which a threat analysis platform uses one or more file analysis engines to analyze a provided document or other type of file for security-related threats an according to some examples.

FIG. 12 is a flow diagram illustrating operations of a method in which a threat analysis platform automates the analysis of a security-related threat by following an attack chain involving multiple different types of objects according to some examples.

DETAILED DESCRIPTION

Figure 1:
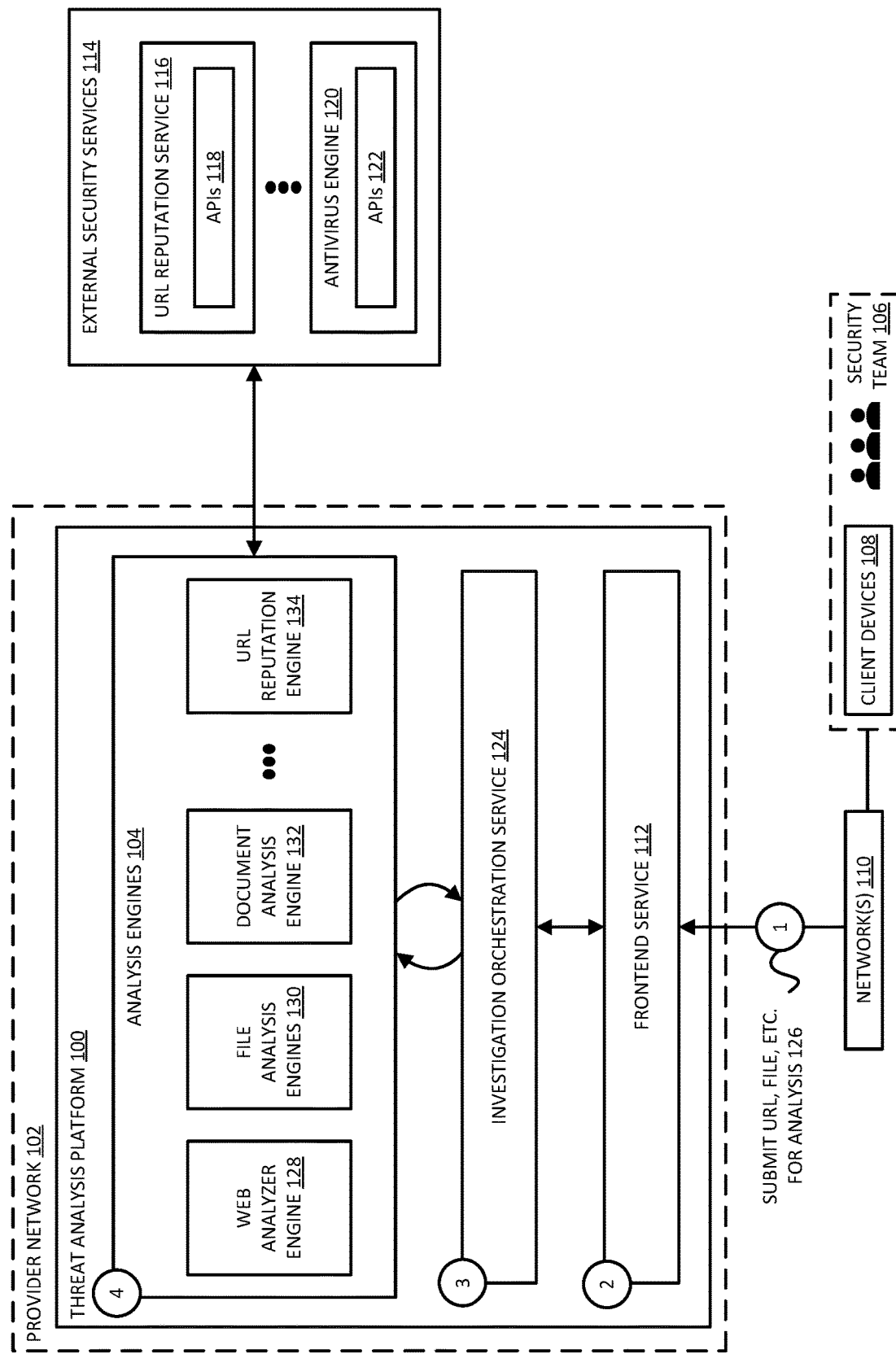
FIG. 1 is a diagram illustrating a computing environment including a threat analysis platform used to automate actions performed to analyze security-related threats affecting IT environments according to some examples.

The present disclosure relates to methods, apparatus, systems, and non-transitory computer-readable storage media for providing a threat analysis platform capable of automating actions performed to analyze operational and security-related threats affecting IT environments. According to examples described herein, users or applications can submit objects (e.g., URLs, files, etc.) for analysis by the threat analysis platform. Once submitted, the threat analysis platform routes the objects to one or more dedicated engines designed to perform a variety of static and dynamic analysis processes to determine a likelihood that an object is associated with malicious activity such as phishing attacks, malware, or other types of security threats. The automated actions performed by the threat analysis platform can include, for example, navigating to submitted URLs and recording activity related to accessing the corresponding resources, analyzing documents and other files by extracting text and metadata, extracting and emulating execution of embedded source code, performing optical character recognition (OCR) and other types of image analysis, submitting objects to third-party security services for analysis, among many other possible actions. As the platform detects new objects during analysis (e.g., a file downloaded from an accessed URL provided for analysis, a URL contained in a document provided for analysis, etc.), the threat analysis platform can selectively reinject those objects into the platform for further analysis. The threat analysis platform aggregates the results from the performed analyses and displays the results in an intuitive manner and further enables the results to be consumed by other applications or services via application programming interfaces (APIs).

In existing IT environments, the investigation of potential security threats by security analysts or other users typically begins with a user receiving notification of a potential security threat. For example, a security analyst might receive notification of a potential security threat through various channels such as an alert from security software, a report from a user within an IT environment for which the security analyst is responsible, or from any other source. Once an analyst has been notified of a potential security threat, the analyst can analyze the potential threat to better understand whether the threat is indeed malicious or not and, if so, determine how to react to the threat. The actions performed by an analyst can involve, for example, reviewing system or network traffic logs, setting up and manually interacting with the threat in a sandboxed environment, and the like.

There remain several inefficiencies in the way security analyst teams analyze potential security threats, particularly as security threats continue to evolve with attackers becoming more sophisticated and as new attack methods are developed. For example, many of the actions performed by analysts represent time-consuming processes, such as setting up sandboxed computing environments to test websites or files for malicious content, reviewing links or files deriving from an initial threat object under analysis, comparing attributes of links or files to known types of security threats, and so forth. Furthermore, the ad hoc way in which security analysts typically perform such actions can often result in inconsistent threat analysis procedures, thereby leading to threats being analyzed improperly or missed entirely. This can be particularly true in situations in which novel security threats are encountered, where security analysts may not recognize how to effectively analyze the threat.

These challenges, among others, are addressed by a software-based threat analysis platform that includes dedicated engines for automating a wide variety of actions to analyze security threats. As indicated, the threat analysis platform includes a collection of analysis engines each designed to automate certain types of security analysis actions such as, for example, automatically navigating to resources identified by URLs and recording activity information associated with accessing the resources, analyzing documents and other types of files for malicious content, analyzing embedded macros or other source code contained in resources under investigation, and the like. The threat analysis platform provides web-based interfaces, APIs, email gateways, and other mechanisms that enable users and applications to readily submit resources for investigation, enabling security teams and other entities to investigate security threats more efficiently and accurately, thereby improving the security and operation of users' IT environments.

FIG. 1 is a diagram illustrating a computing environment including a threat analysis platform used to automate actions performed to analyze security-related threats affecting IT environments according to some examples. In the example of FIG. 1, the threat analysis platform 100 executes at least in part using computing-related resources provided by a cloud provider network 102. The computing-related resources provided by a cloud provider network 102 can include compute resources (e.g., virtual machines (VMs), containers, on-demand code execution resources, etc.), storage resources (e.g., databases, object storage, block-level storage, etc.), network-related resources, identity and access management resources (e.g., user accounts, roles, policies, etc.), and the like. A cloud provider network 102 typically provides these and other resources via services such as, e.g., compute services that can execute virtual machines, containers, code, etc., storage services that can provide and manage databases, object storage resources, and so forth. In other examples, the threat analysis platform 100 can execute on computing resources provided within an on-premises computing environment, by computing resources provided by two or more separate cloud provider networks, using a hybrid computing environment including both cloud computing resources and on-premises resources, or any combination thereof.

According to examples described herein, the threat analysis platform 100 is capable of investigating potential security threats associated with computing-related objects such as URLs and their associated resources (e.g., web pages, images, videos, etc., accessed via a URL), files, and the like. In some examples, the threat analysis platform 100 provides a collection of analysis engines 104 designed to automate actions relevant to security investigations of such objects. As an example, consider the identification of a phishing email as reported by a user or flagged by a software-based security tool. Using existing security applications, once the phishing email is identified, a "case" or "investigation" might be opened in another type of security application (e.g., a security, automation, orchestration, and response, or SOAR, tool) and the email can be associated with the case as an artifact. Typically, a security analyst is then responsible for analyzing the case including determining how to investigate the email to determine whether it is associated with malicious content or activity. The email, for example, might contain text, images, URLs, and other elements that can be independently investigated by the analyst.

According to examples described herein, the threat analysis platform 100 more efficiently and accurately performs these and other types of investigative actions for provided objects. The threat analysis platform 100 automatically identifies objects to investigate, including objects derived from an initial object provided for analysis (e.g., a file downloaded from a provided URL, where the file might contain additional URLs linking to more files, and so on), automates a collection of investigative actions depending on a type of the objects, and provides analysis output illustrating the actions performed by the platform and scoring information indicating an estimated risk level associated with analyzed objects and associated artifacts.

Users of the threat analysis platform 100 (e.g., individual members of a security team 106 or any other type of users) can use client devices 108 to interact with the threat analysis platform 100 across intermediate network(s) 110 via one or more interfaces provided by a frontend service 112. The network(s) 110 can include, for example, local networks, the public internet, etc. The frontend service 112 can provide web-based consoles, standalone client applications, application programming interfaces (APIs), among other possible interfaces for interacting with the threat analysis platform 100. An API broadly refers to set of rules and protocols that allow clients and servers to communicate with each other. In the context of a threat analysis platform, the APIs and other interfaces provided by the frontend service 112 enable client devices 108 and other applications to request the threat analysis platform 100 to analyze URLs, files, or other computing-related objects for security-related issues, enable the threat analysis platform 100 to provide results information back to client devices 108, among other possible types of actions. In some examples, users can use user accounts to access the threat analysis platform 100, for example, to enable the threat analysis platform 100 to store information about user preferences, to display personalized content and recommendations, to save users' threat analysis histories, to restrict access to certain parts or features of the threat analysis platform 100, among other purposes.

As indicated, the threat analysis platform 100 includes a collection of analysis engines 104 providing purpose-built functionality for performing different types of security-related analyses as orchestrated by an investigation orchestration service 124. For example, the investigation orchestration service 124 can receive requests routed from the frontend service 112 to analyze provided objects (e.g., URLs, files, etc.), determine one or more analysis engines 104 to invoke based on a type of the provided object or other information, monitor execution of any invoked analysis engines 104, optionally invoke additional analysis engines 104 based on additional objects encountered during the investigation, aggregate and normalize results obtained from the analysis engines 104, and provide the results for display or API consumption.

The threat analysis platform 100 can be implemented using program code executed using one or more computing devices. A computing device is an electronic device that has a memory for storing program code instructions and a hardware processor for executing the instructions. The computing device can further include other physical components, such as a network interface or components for input and output. The program code for the threat analysis platform 100 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power to retain data.

In various examples, the program code for the threat analysis platform 100 can execute on a single computing device, or may be distributed over multiple computing devices. In some examples, some or all of analysis engines 104 (and possibly other components of the threat analysis platform 100) can be implemented as containerized applications. The execution of these containerized applications can be managed, for example, by a container orchestration and management service provided by the cloud provider network 102. In some examples, the container service can be a Kubernetes®-based or Docker®-based container orchestration and management service. In this context, the implementation of analysis engines 104 or other components of the threat analysis platform 100 as containers can include packaging the associated software with dependencies (e.g., libraries and configuration files) into a lightweight, portable, self-sufficient container that can run on any infrastructure supporting the associated containerization technology. Among other benefits, the containerization of application components in this manner provides a consistent and isolated environment for the applications to run in, allows for better scalability and resource utilization, as well as improved security since the containers are isolated from the host and other containers. In other examples, the analysis engines 104 or other components of the threat analysis platform 100 can be implemented using other types of programs running in VMs, standalone servers, etc.

The analysis engines 104 can further interface with external security services 114 to supplement analyses performed by the engines, to enrich artifacts analyzed by the engines, or to request any other information or actions. For example, one or more analysis engines 104 can interact with an external URL reputation service 116 (e.g., via APIs 118 provided by the URL reputation service 116) to obtain URL reputation scores, an antivirus engine 120 (e.g., via APIs 122 provided by the antivirus engine 120) to analyze files for the presence of malicious code, or any other relevant services. Although displayed separately from the cloud provider network 102, the analysis engines 104 can also interface with other applications or services provided by the provider network 102 as needed. Furthermore, in some examples, some analysis engines 104 can be hosted and execute in other cloud provider networks, in an on-premises computing environment, or any combinations thereof, and interface with an investigation orchestration service 124 across one or more networks.

In FIG. 1, the numbered circles labeled "1"-"3" illustrate a high-level process for using the threat analysis platform 100 to analyze different types of computing-related objects for security-related issues. At circle "1," a user or application submits an object (e.g., a URL, a file, etc.) for analysis 126. As indicated above, a user can submit an object to the threat analysis platform 100 using an interface provided by the frontend service 112 such as, e.g., a web-based console, client application, etc. In other examples, objects can be submitted to the threat analysis platform 100 for analysis programmatically, for example, by other security applications or services upon the detection of potentially malicious objects. For example, a user or security applications can submit suspicious email attachments, URLs included in documents or emails, URLs obtained from log data or other networking monitoring tools, files stored on computing devices within a user's IT environment, or objects obtained from any other source.

Figure 2:
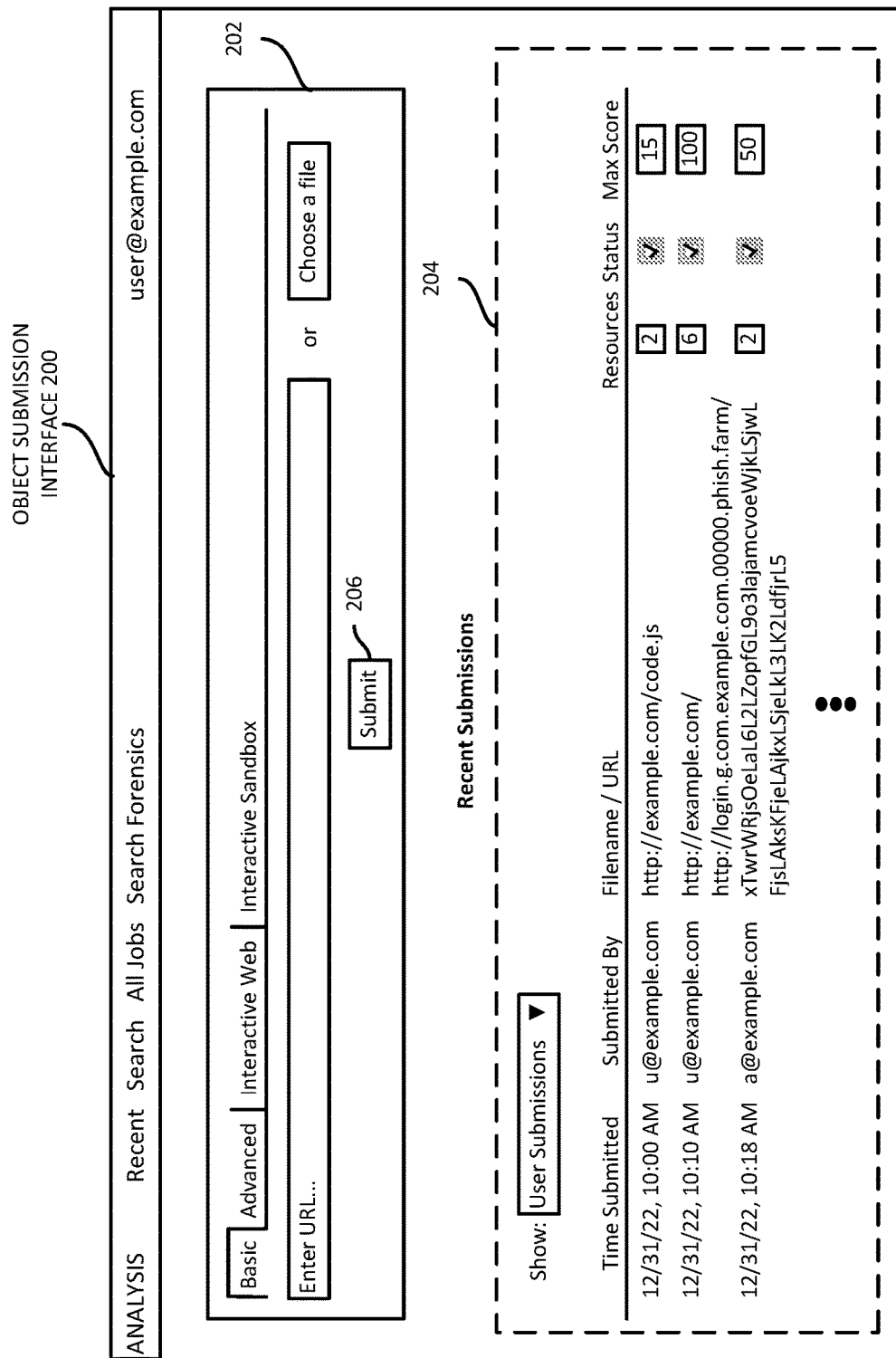
FIG. 2 illustrates an example user interface enabling the submission of objects (e.g., Uniform Resource Locators (URLs), files, etc.) for analysis by the threat analysis platform according to some examples.

FIG. 2 illustrates an example user interface enabling the submission of objects (e.g., URLs, files, etc.) for analysis by the threat analysis platform according to some examples. As shown, the object submission interface 200 includes a submission section 202 and a recent submissions section 204. The submission section 202 includes interface elements that enable users to submit URLs, files, or other objects for analysis by the threat analysis platform 100. Once a URL, file, or other object of interest is provided via the interface, a user can select the submit button 206 to initiate analysis of the provided object. The recent submissions section 204 includes information about past objects provided for analysis such as, for example, a time at which the objects were submitted for analysis, a user associated with each submission, a filename or URL identifier of each object, a number of resources investigated during each analysis, an indication of whether the analysis has completed, and a maximum risk score identified during the analysis (e.g., where a higher maximum risk score may indicate a higher likelihood that the submitted object is associated with a malicious security threat).

Returning to FIG. 1, once an object is provided to the threat analysis platform 100, at circle "2," the frontend service 112 forwards the request to the investigation orchestration service 124. At circle "3," the investigation orchestration service 124 initiates and manages the analysis of the provided object. In general, the orchestration of a security analysis by the investigation orchestration service 124 can include identifying one or more analysis engines 104 to invoke based on a type of object submitted to the threat analysis platform 100, routing the object (and possibly additional objects derived from the initial object during analysis) to the identified analysis engines 104 (illustrated by circle "4"), aggregating results information generated by the analysis engines 104, and providing the results for display to a user, for delivery to another application or service via an API or other interface, or for any other purposes. As described in more detail hereinafter, the actions performed by the analysis engines 104 can include navigating to resources identified by provided URLs and recording activity associated with the navigation (including, e.g., generating screenshots of resources located at provided URLs, recording domains and IP contacted as a result of URL navigations, collecting web page artifacts such as text and images included on a web page, cookies, etc.), extracting file metadata, performing image analysis, performing OCR text extraction, macro source code or other encoded instruction detection in documents, and the like. As shown in FIG. 1, example types of analysis engines 104 include a web analyzer engine 128, a file analysis engine 130, a document analysis engine 132, a URL reputation engine 134, among many other possible types of engines.

As indicated, one example type of analysis engine 104 is a web analyzer engine 128. In some examples, a web analyzer engine 128 is designed to analyze resources located at provided URLs or IP addresses to identify instances of phishing-related security threats or other malicious content delivered via the web. The objects analyzed by the web analyzer engine 128 may be submitted for analysis, for example, based on the identification of URLs or other identifiers included in suspicious emails, included in documents or other types of files, or from any other source. Many existing security products attempt to identify malicious websites by comparing a URL or other website identifier against a database of known malicious URLs/IP addresses (e.g., to identify a "reputation" of a URL). The web analyzer engine 128 instead employs multiple automated processes to dynamically identify instances of phishing attacks and other malicious content associated with web resources, thereby enabling the web analyzer engine 128 to potentially detect even malicious websites that have not yet been identified as threats by other threat analysis sources.

Figure 3:
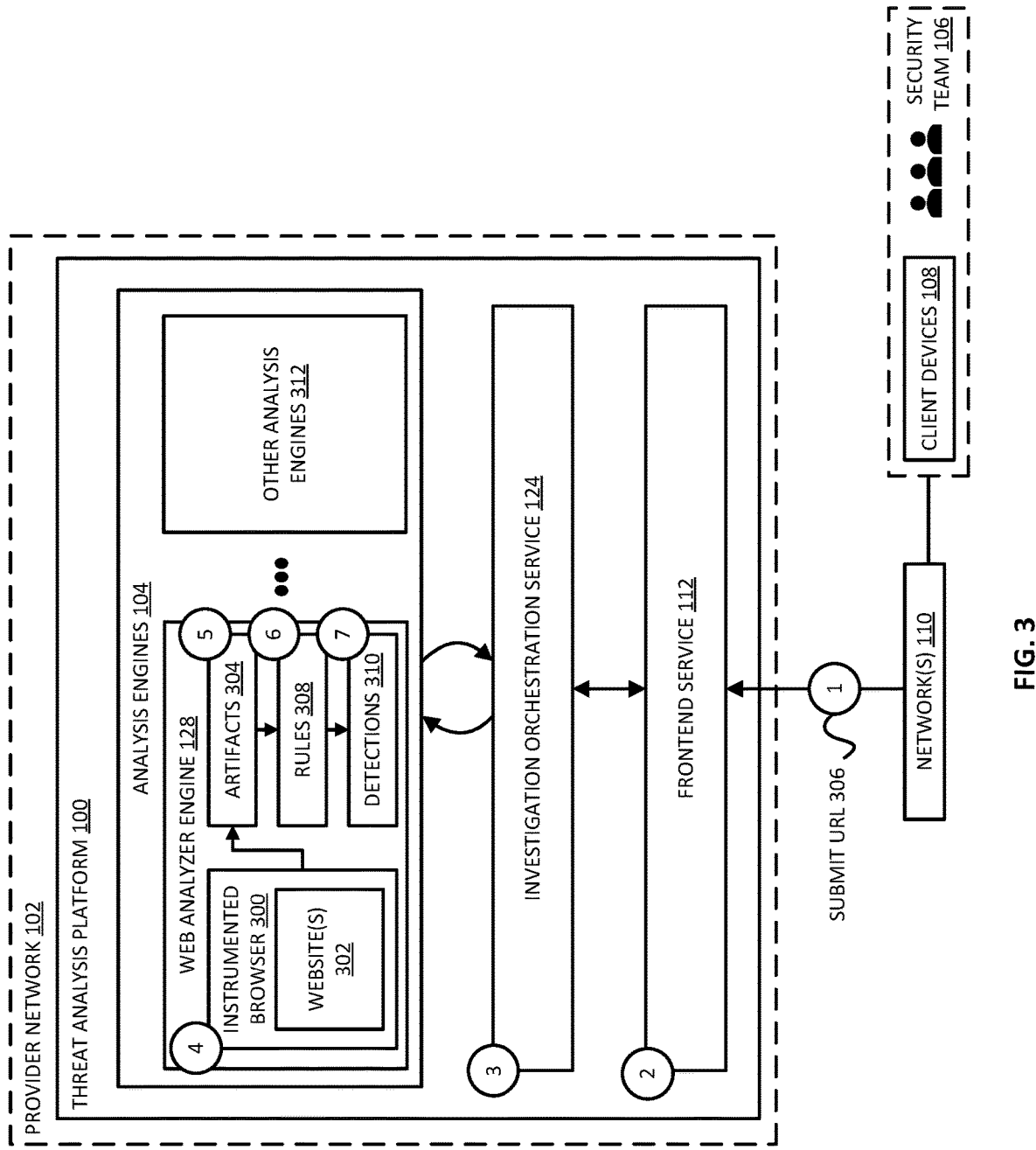
FIG. 3 is a diagram illustrating additional details of a web analyzer engine used by the threat analysis platform to analyze URLs and associated resources for security-related threats according to some examples.

FIG. 3 is a diagram illustrating additional details of a web analyzer engine used by the threat analysis platform 100 to analyze URLs and associated resources for potential security-related threats according to some examples. As shown, the web analyzer engine 128 includes an instrumented web browser 300 used to access resources located at provided URLs (such as, e.g., websites 302) and to collect and log activity information associated with navigating to the URLs (e.g., represented by artifacts 304). The artifacts 304 can include any aspects of navigating to a provided URL or attributes of the resources identified by a URL including, for example, log information about domain and IP addresses accessed during the URL navigation (e.g., via browser redirects or as part of requests for other resources such as JavaScript scripts, Cascading Style Sheets (CSS), images, etc.). The instrumented browser 300 can also collect hypertext document source information, files, content dynamically generated by JavaScript or other client-side scripting at runtime, and can generate screenshots of accessed webpages, among other possible types of artifacts 304.

In FIG. 3, the numbered circles "1"-"7" illustrate an example use of the web analyzer engine 128 to analyze a URL provided to the threat analysis platform 100. As shown, at circle "1," a user or application submits a URL 306 or other resource identifier to the threat analysis platform 100 via a frontend service 112. As indicated, an object can be submitted to the threat analysis platform 100 in any of several different ways including via a web-based console, API, and the like. At circle "2," the frontend service 112 receives and forwards the request to the investigation orchestration service 124. At circle "3," the investigation orchestration service 124 determines that the request relates to analysis of a URL and routes the request, including the URL, to the web analyzer engine 128.

At circle "4," the web analyzer engine 128 causes an instrumented browser 300 to navigate to a resource (e.g., a web page) associated with the URL. In some examples, the web analyzer engine 128 can execute the instrumented browser 300 in a sandboxed or otherwise isolated computing environment (e.g., a container, VM, etc.) launched by the web analyzer engine 128. The instrumented browser 300 can also be associated with other isolated security boundaries, such as with the use of a firewall or kernel-level security module, by using software libraries or frameworks that provide restricted environments for running untrusted code (e.g., JavaScript sandboxes), and the like. The web analyzer engine 128 can launch any number of instrumented browsers 300 in any number of separate isolated computing environments to process requests to analyze URLs received over time, where such computing environments can be launched, scaled, and terminated as needed.

As indicated, the instrumented browser 300 records activity associated with navigating to a resource identified by the provided URL and, at circle "5," stores information about the activity and any accessed resources as artifacts 304. For example, the instrumented browser 300 can include plug-ins or other code extensions used to collect and log information about navigation activity invoked by the web analyzer engine 128 or by accessed resources. For example, the activity associated with navigating to a resource can include subsequent requests caused by browser redirects, meta tags used to refresh a web page after a specified amount of time, JavaScript redirections, server-side redirections, reverse proxying, and the like. In some examples, the collected activity information and other artifacts 304 can be stored in a database or other datastore accessible to the instrumented browser 300, web analyzer engine 128, and possibly other components of the threat analysis platform 100 (e.g., the investigation orchestration service 124 and other analysis engines 312).

At circle "6," in some examples, one or more risk scoring engines or other components of the web analyzer engine 128 use rules 308 to determine whether any of the artifacts 304, or combinations of artifacts 304, potentially represent security-related concerns. For example, the rules 308 can analyze the artifacts 304 to look for attributes of the artifacts known to be present in other security threats such as text elements in a web page, domain names or domain name patterns, specific image files, domain registration information, JavaScript code snippets or patterns, or any other attributes of a resource or combinations thereof. In other examples, the risk scoring engines or other components can use machine learning-based models, external threat analysis services, or other tools to analyze artifacts 304 or to supplement the analysis of artifacts 304.

In some examples, the risk scoring engines and rules 308 can associate certain types of artifacts 304 or combinations of artifacts with risk scores used to reflect a likelihood that the artifacts are associated with a security-related threat, where some artifacts or combinations of artifacts can be associated with higher scores relative to other artifacts. For example, one rule 308 might specify that identification of a particular image file included in a web page is associated with a risk score of "20", while another rule 308 might specify that identification of the particular image file in combination with an identified JavaScript artifact is associated with a risk score of "80," and so forth. In some examples, at circle "7," the web analyzer engine 128 can generate detections 310 based on artifacts 304 or combinations of artifacts 304 matching one or more rules 308, where each detection 310 can be associated with a risk score assigned to the detection based on the corresponding rule 308 as illustrated above. The detections 310 can be displayed in one or more user interfaces, provided to other components of the threat analysis platform 100 or to external applications or services, used for subsequent analysis processes, and the like. In some examples, the web analyzer engine 128 can determine an aggregate risk score for a provided object based on the detections 310, for example, by identifying a maximum risk score in the detections, summing or averaging the risk scores associated with individual detections, or performing other calculations.

Figure 4:
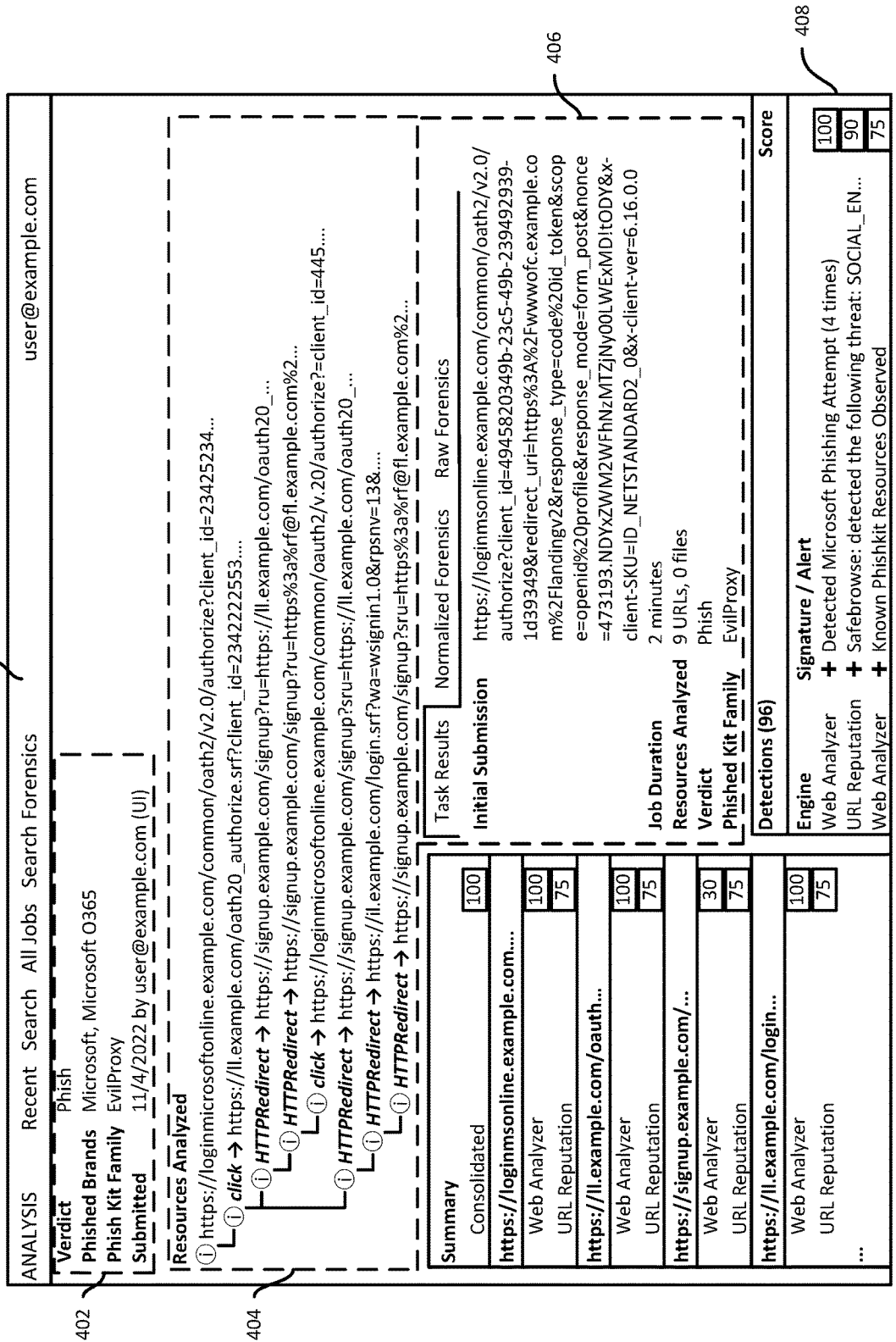
FIG. 4 illustrates an example user interface displaying results information generated by the threat analysis platform responsive to the analysis of a provided URL according to some examples.

FIG. 4 illustrates an example interface displaying results associated with the analysis of a URL by the threat analysis platform according to some examples. In FIG. 4, the interface 400 includes results summary information 402 (indicating, in this example, that the provided URL appears to be associated with a phishing-related security threat), a resource analysis hierarchy 404, task results information section 406, and a detections section 408. As shown, the resource analysis hierarchy 404 provides a hierarchical representation of URLs that were analyzed based on navigating to an initially provided URL. In this example, several additional URLs were accessed due to HTTP redirects and the web analyzer engine 128 following other URLs included in the accessed resources (e.g., by simulating a user clicking on a hyperlink or other interactive interface element). The hierarchical representation illustrated in the resource analysis hierarchy 404 enables analysts to understand both which URLs and other resources were accessed during the analysis and an order in which the URLs were accessed relative to the initial access. In some examples, a user can select any of the resources in the resource analysis hierarchy 404 to view additional information about the resource including, e.g., any generated screenshots of the resource, artifacts collected as a result of navigating to the resource, detections resulting from the resource, and the like.

As indicated, the web analyzer engine 128 obtains URLs to be analyzed for the presence of security threats, causes an instrumented browser 300 to navigate to resources located at the URLs, identifies artifacts 304 associated with the resources, and uses risking scoring engines to assign risk scores to the artifacts and associated detections 310. The web analyzer engine 128 can also navigate to additional URLs contained in or otherwise deriving from the initially accessed resource or otherwise interact with available interactive interface elements. For example, an initially accessed resource might be a web page that contains one or more interactive interface elements such as text hyperlinks, buttons, images, or other elements that, upon selection (e.g., upon a user clicking the element using a pointing device such as a mouse or touchpad), cause a browser to navigate to one or more additional resources. In other examples, an interactive interface element can cause the dynamic generation of additional content, or modification of existing content, responsive to interaction with the interface element. For example, interaction with an interactive interface element can cause a web page or other resource to obtain, generate, or otherwise reveal additional content including content that may be malicious or lead to potentially malicious content. According to examples described herein, the web analyzer engine 128 automates the selection of certain interactive interface elements (e.g., the web analyzer engine 128 can emulate a user clicking a hyperlink, button, or other interactive interface element displayed in connection with a web page or other resource) identified during use of the instrumented browser 300 to navigate to additional resources or otherwise cause additional content to be generated. However, following or otherwise interacting with all interactive elements associated with a resource, and further following or interacting with all interactive elements associated with subsequently accessed resources or content, can potentially cause the web analyzer engine 128 to access a vast number of resources, many of which may not be highly relevant to an investigation of security threats.

Accordingly, in some examples, the operation of the web analyzer engine 128 includes techniques for determining which interactive interface elements to follow or otherwise interact with and when to cease interacting with additional interactive interface elements. For example, upon navigating to a resource (e.g., based on an initially provided URL or subsequently accessed URL), the web analyzer engine 128 identifies artifacts associated with the resource, where the artifacts can include one or more interactive interface elements (e.g., hyperlinks represented by text or images, buttons, etc.), and where some or all the interactive interface elements can be associated with a respective URL or otherwise result in the generation of additional resource content. The web analyzer engine 128 can assign to the interactive interface elements respective interaction scores indicating a predicted relevance of each interactive interface element to a security investigation. For example, a button displayed prominently on a web page, and which includes text inviting a user to click the button, may likely be more relevant to a security investigation (e.g., because it may cause a user to potentially navigate to a malicious web page, download a malicious payload, reveal additional malicious content, etc.) compared to a small text-based hyperlink displayed at the bottom of a web page and which a user is less likely to click.

In some examples, the web analyzer engine 128 can assign interaction scores to identified interactive interface elements using any number of rules and heuristics such as, for example, identifying any hyperlinks, buttons, or other selectable interface elements associated with text inviting a user to click the interface element, identifying a placement of the interactive interface elements on a web page (e.g., where interface elements displayed in a central location on a page, or adjacent to other specific types of interface elements, can be assigned a higher interaction score compared to peripherally displayed interface elements), identifying a size of an interactive interface element as displayed on the web page, and the like. The web analyzer engine 128 can also analyze the URLs, scripts, or other information associated with interactive interface elements displayed on the web page, for example, to determine whether a top-level domain (TLD) or other component of the URL is known to be associated with abuse, determine whether a domain has been previously added to a threat list, or whether a pattern in the URL is often associated with malicious links, determine whether a URL leads to a PHP Hypertext Preprocessor (PHP) script, and the like.

Based on these and possibly other attributes of the interactive interface elements included in a web page, in some examples, the web analyzer engine 128 generates an interaction score for each interactive interface element while further maintaining a list of resources and associated interactive interface elements observed by the web analyzer engine 128 during the analysis thus far. For example, each of these possible attributes of an interactive interface element can be associated with a numerical value that can be used to score the interactive interface elements along several dimensions. The individual values for the identified attributes of each interactive interface element can be summed, averaged, normalized, or otherwise combined to arrive at an overall interaction score for each interactive interface element. In some examples, at each step, the web analyzer engine 128 can rank the interaction scores for interactive interface elements that have not yet been analyzed and select one or more highest ranking interface elements to further analyze (e.g., simulate a user clicking the link, button, or otherwise interacting with an interactive interface element). Once the web analyzer engine 128 causes the instrumented web browser 300 to navigate to the URL or URLs identified by the one or more highest ranking interface elements, the web analyzer engine 128 can reiterate the process to select one or more additional interactive interface elements to analyze, where the set of candidate interactive interface elements can now include interface elements associated with any newly accessed web pages or other resources.

The web analyzer engine 128 can continue the process described above to collect artifacts 304 across any number of separate resources. As indicated above, however, this process could potentially continue indefinitely depending on the types of URLs present on each of the analyzed resources. The web analyzer engine 128 thus further determines when to cease investigating additional URLs based on an "interestingness" threshold value (e.g., a numerical value that corresponds to a possible range of interaction scores). For example, the web analyzer engine 128 can begin the analysis with a threshold value indicating a minimum interaction score that interactive interface elements are to meet or exceed for the web analyzer engine 128 to invoke additional analysis. In some examples, each time the web analyzer engine 128 interacts with a new interactive interface element, the web analyzer engine 128 can increase the threshold value of interestingness. In this manner, as the web analyzer engine 128 traverses further down a series of URLs, only URLs with increasingly high interaction scores will satisfy the threshold to warrant further investigation. Once the web analyzer engine 128 has investigated any URLs satisfying the threshold, the web analyzer engine 128 can cease the analysis and return any obtained results information. In some examples, the web analyzer engine 128 can also assign higher interaction scores to URLs that are newer in the analysis. For example, if there are five interactive interface elements present on a first web page and one interactive interface element on a more recently access web page during the analysis, assuming all six interactive interface elements are associated with similar interaction scores, the web analyzer engine 128 can prioritize the newest interactive interface element. This can help ensure, for example, that the web analyzer engine avoids overly focusing its investigation at any one accessed resource.

Once the web analyzer engine 128 collects the artifacts, generates risk scores and detections based on any rules 308, the web analyzer engine 128 can aggregate the scores and detections for display or consumption by another application. As shown in FIG. 4, a task results information section 406 and detections section 408 can display information about a submitted object and any identified detections 310. The task results information section 406, for example, can include display of an identifier of the initially provided object, a duration of the analysis, a number of resources analyzed (e.g., URLs, files, etc.), a verdict (e.g., whether the threat analysis platform 100 identified the provided object as being associated with a phishing-related threat, malware threat, etc.), and information about the identified type of threat. The detections section 408 provides additional information related to how the threat analysis platform 100 arrived at the task results including, for example, indications of artifacts or artifact combinations associated with the identified threat and a risk score assigned to each of the detections. In some examples, the selection of a detection displayed in the detections section 408 causes display of additional information about the detection, including information about the artifacts leading to the detection.

Figure 5:
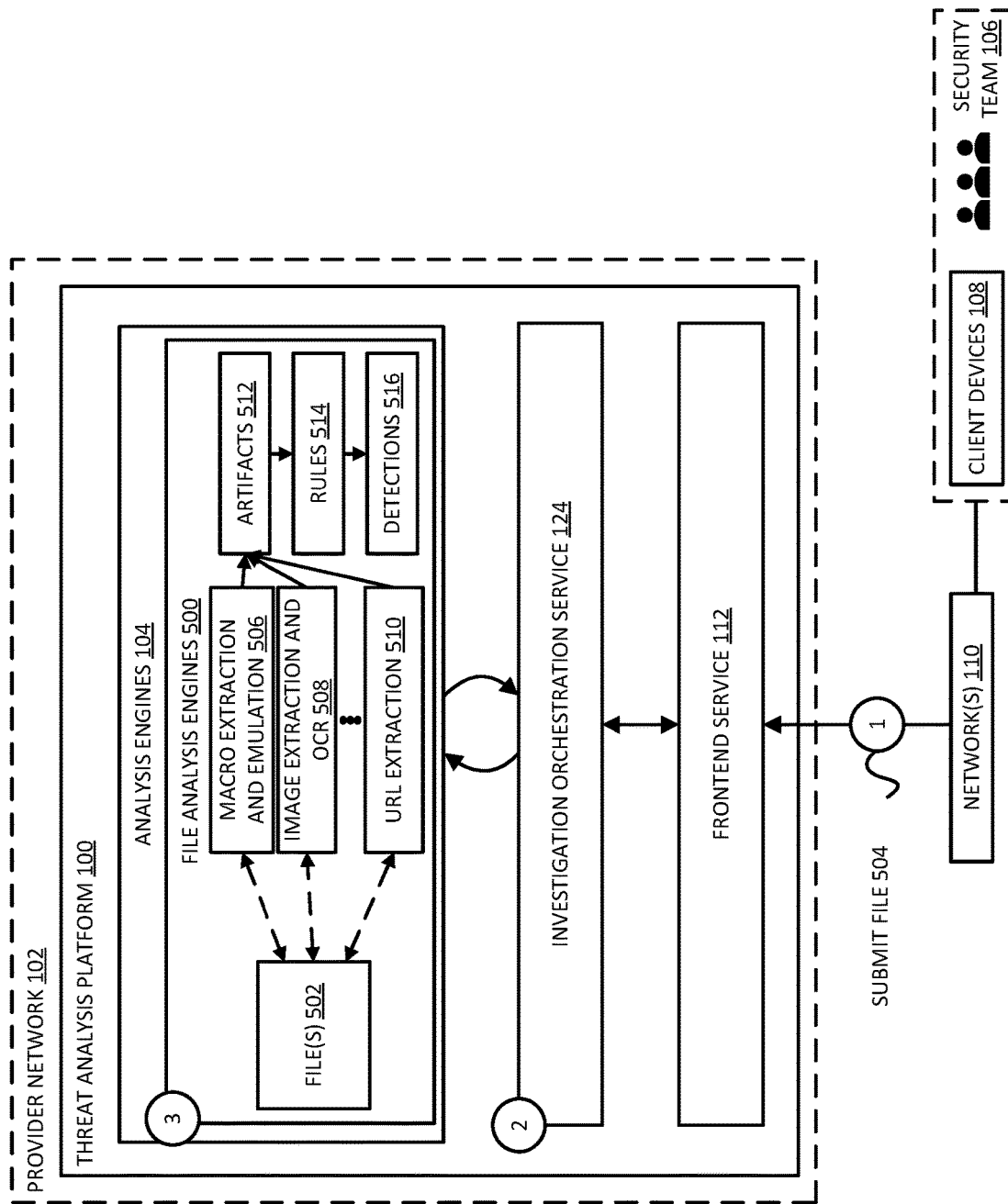
FIG. 5 is a diagram illustrating additional details of file analyzer engines used by the threat analysis platform to analyze documents and other types of files for security-related threats according to some examples.

Another example type of analysis engine 104 is a file analysis engine. FIG. 5 is a diagram illustrating additional details of file analysis engines 500 used by the threat analysis platform to analyze documents and other types of files 502 for security-related threats according to some examples. The analysis of documents and files, e.g., word processing files (e.g., ".doc", ".docx", ".rtf", or ".odt" files), portable document format files (e.g., ".pdf" files), spreadsheet files (e.g., ".xls", ".xlsx", ".csv".or ".ods" files) presentation files, text-based files, images, compressed files, etc., is often relevant to security analyses because of their frequent use as vectors to malware, phishing attacks, and other security issues. The file analysis engines 500 can perform a wide range of actions on documents or other types of files provided to the threat analysis platform 100 including, for example, analyzing document text or other file elements, extracting file metadata, decrypting encrypted files, extracting text or other detectable elements from images or documents, detecting embedded macros or other encoded instructions (e.g., executable source code, PowerShell commands, etc.) in files, executing or emulating execution of detected macros or code, among many other possible actions. Although shown in FIG. 5 as a single file analysis engine 500, in other examples, the file analysis engines 500 can represent any number of distinct engines for processing different types of files (e.g., shown as a file analysis engine 130, document analysis engine 132, and possibly other types of engines in FIG. 1). The numbered circles "1"-"3" in FIG. 5 illustrate an example process in which the threat analysis platform 100 uses one or more file analysis engines 500 to analyze a provided file for security issues.

Similar to the examples illustrated in FIG. 1 and FIG. 3, at circle "1" in FIG. 5, a user or application submits 504 a file for analysis via a web-based console, API, or other interface provided by frontend service 112. At circle "2," the investigation orchestration service 124 determines a type of the file and, based on the type of the file, identifies one or more file analysis engines 500 to use to analyze the file (illustrated by circle "3"). As indicated, the threat analysis platform 100 can include one file analysis engine 500 used to analyze a variety of file types, or the threat analysis platform 100 can include multiple separate file analysis engines 500 each used to analyze one or more specific types of files (e.g., one analysis engine for text-based documents, another analysis engine for binary files, another analysis engine for compressed files, and the like).

In FIG. 5, the file analysis engines 500 analyze a provided file 502 using one or more analysis actions as relevant to the file type. As illustrated, the example analysis actions can include, for example, macro extraction and emulation 506 (including extracting and emulating, e.g., Visual Basic for Applications (VBA) macros, XLS macros, and the like), image extraction and OCR 508, URL extraction 510, among many other types of actions such as extracting and emulating macros from HTML Application (HTA) files and Windows Script File (WSF) files, and others described hereinafter. The file analysis engines 500 can invoke particular actions depending on an identified type of the file 502, depending on attributes of the file identified during analysis, or responsive to other information generated during analysis.

As indicated, one example type of action can involve a file analysis engine 500 identifying one or more macros, scripts, or other executable code in a word processing document, spreadsheet document, or other type of file. In some examples, the file analysis engines 500 can emulate extracted macros or other code in an isolated environment, such as a container or VM, to observe its behavior and analyze its functionality, thereby allowing the file analysis engines 500 to identify malicious or suspicious behavior in the macro code or other encoded instructions, such as the use of known malware or the ability to exfiltrate data from an infected host system. For example, the file analysis engine 500 can launch an isolated computing environment using resources provided by the provider network 102, or using any other computing environment, and execute or emulate execution of at least a portion of the macro code or encoded instructions to identify artifacts generated by the executed code. The emulation of macro code or encoded instructions can be particularly useful in cases where an attacker may have used techniques to obfuscate the malicious code such as, e.g., using string obfuscation to make the macro code or encoded instructions more difficult to read, control flow obfuscation, and the like. In some examples, the artifacts generated by emulating macro code or encoded instructions can include additional macro code generated by the macro code or encoded instructions and which performs malicious actions. A file analysis engine 500 can then analyze the generated macro code or encoded instructions, or other artifacts generated during emulation of the macro code or encoded instructions, to determine whether the macro code or encoded instructions appears to represent a security threat. In some examples, the emulation of macros or other code can be performed by a file analysis engine 500 using software libraries or frameworks designed to read and perform the actions specified in the macro code or encoded instructions, while further generating logged output associated with the macros' behavior.

The file analysis engines 500 can further include analysis actions involving analyzing and extracting information from Office Open XML (OOXML) files to understand the structure of the files and to potentially extract and analyze components that may contain malicious macros, embedded scripts, or other types of malicious payloads. As another example, the file analysis engines 500 can include document image extraction and OCR actions used to extract images from documents or other files and to identify text in the images that may be associated with malicious activity (e.g., URLs, email addresses, phone numbers, or other information associated with malicious activity). As another example, the actions can include image object and logo detection used to detect the presence of logos or other visual elements known to be associated with certain types of security threats. As yet another example, the actions can include image perceptual hashing (or image fingerprinting) used to create digital signatures of an image or portion of an image for comparison to images known to be associated with malicious activity. For example, attackers sometimes send images representing fraudulent invoices or other malicious content and perceptual hashes of those images, or portions thereof, can be compared against a database maintained by the threat analysis platform 100 to determine a likelihood the image is malicious.

Another example type of action that can be performed by file analysis engines 500 includes extracting URLs from Advanced Systems Format (ASF) files. For example, ASF is a digital multimedia container format used to store digital video and audio streams, as well as metadata, where such files can contain URLs associated with other resources. The extraction of URLs from ASF files can enable the file analysis engines 500 to identify URLs that may be associated with malicious payloads or websites. Yet another example type of action is identifying and emulating shellcode (e.g., code, often written in assembly language, used to perform a specific task such as download and executing a payload, exfiltrating data, etc.) embedded in or delivered through a document file. Similar to the emulation of macros, the file analysis engines 500 can emulate the shellcode in an isolated environment, such as a container or VM, to observe its behavior and collect associated artifacts 512.

The file analysis engines 500 can further implement actions including embedded image orientation correction (e.g., to correct the orientation of images included in a document or other resource), headless document screenshot generation, extracting and reconstructing URLs from files or other resources, decoding encoded strings included in text documents or other resources, and extracting passwords from encrypted files (e.g., encrypted compressed files, word processing documents, etc.). In some examples, the file analysis engines 500 can decrypt some files using brute force decryption in which the file analysis engines try possible keys or passwords until the correct one is found. In some examples, the file analysis engines 500 can also extract document metadata from various types of files, extract files embedded in other files, extract Dynamic Data Exchange (DDE) commands from a file, among other possible actions. In some examples, the types of actions can further include identifying Quick Response (QR) in images or other resources and causing a web browser (e.g., an instrumented browser 300) to navigate to a URL identified by a QR code for analysis.

As shown in FIG. 5, the actions performed by the file analysis engines 500 can result in artifacts 512. These artifacts 512, as indicated above, can include text data extracted from documents or files, file metadata, URLs or other files embedded in a file, images and image perceptual hashes, extracted image objects and other features, embedded macro code or encoded instructions segments, emulated macro code or encoded instructions information, among many other possible types of artifacts. Similar to the web analyzer engine 128, the file analysis engines 500 can include one or more rules engines and associated rules 514 used to identify certain artifacts 512, or combinations of artifacts, as detections 516 associated with one or more potential types of security threats. In some examples, the investigation orchestration service 124 can cause the detections 516 and other information resulting from the analyses performed by the file analysis engines 500 to be displayed in one or more interfaces or provided for consumption by other types of downstream components of the threat analysis platform 100 or external applications.

Figure 6:
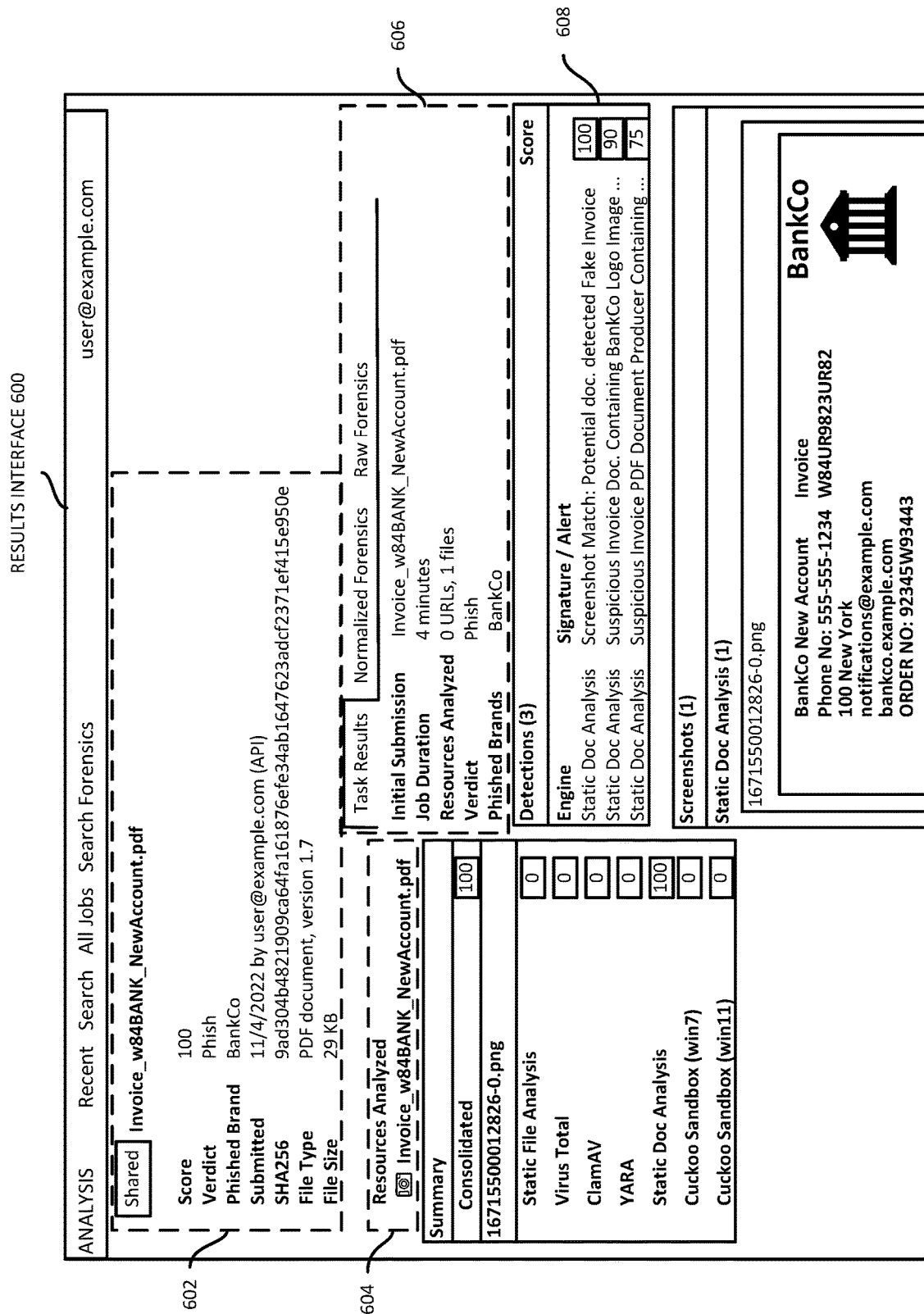
FIG. 6 illustrates an example user interface displaying results information generated by the threat analysis platform responsive to the analysis of a provided file according to some examples.

FIG. 6 illustrates an example user interface displaying results information generated by the threat analysis platform responsive to the analysis of a provided file according to some examples. In this example, a portable document format (PDF) file was provided for analysis by the threat analysis platform 100. The PDF file, for example, might have been included as an attachment in an email or downloaded from a website. In this example, the results interface 600 includes results summary information 602 indicating, in this example, that the provided PDF file appears to be associated with a phishing-related threat. As shown in the resource analysis hierarchy 604, only the individual PDF file was analyzed by the platform thereby indicating that additional objects (e.g., URLs or other files) may not have been identified during analysis of the PDF file.

In the tasks results information section 606 and the detections section 608, the results interface 600 indicates that the file analysis engines 500 identified artifacts indicating that the PDF may represent a fake invoice document associated with a phishing attack. For example, the file analysis engines 500 identified artifacts by extracting a logo from the invoice, generating a hash of the invoice document as a whole, extracting document metadata, among other possible information. The file analysis engines 500 further applied rules 514 against those artifacts to determine that at least some of the artifacts appear to be associated with a known malicious threat, where the detections are each associated with varying risk scores. The results interface 600 further includes a screenshot of the document and other information about the file obtained by static document analysis actions performed by the file analysis engines 500. In this manner, an analyst is presented with a comprehensive understanding of the actions performed by the threat analysis platform 100 to analyze the file, artifacts identified during the analyses, and risk scoring information generated based on application of rules against the identified artifacts.

Figure 7:
FIG. 7 illustrates an example user interface displaying results information generated by the threat analysis platform based on the analysis of a provided image file according to some examples.

FIG. 7 illustrates an example user interface displaying results information generated by the threat analysis platform based on the analysis of a provided image file according to some examples. In this example, the file analysis engines 500 was provided an image file to analyze, where the image file again represents a fake invoice. The file analysis engines 500 in this example performed OCR to identify the inclusion of a phone number, performed image object detection to identify a commonly abused logo or other visual element, generated one or more perceptual hashes of the image to compare against a database of malicious threats, among other actions used to score the image as a potential threat. The results interface 700 in FIG. 7 includes a task results information section 702 indicating that the image appears to be associated with a phishing attack, and further includes identifiers of detections associated with the analysis, a screenshot of the image, among other information.

FIG. 8 illustrates an example user interface displaying results information generated by the threat analysis platform involving the extraction and emulation of macro code or encoded instructions embedded in a document according to some examples. In this example, a file associated with a word processing program was provided to the threat analysis platform 100, where the file contained at least one embedded macro, and the results of the analysis are displayed in a results interface 800. The file analysis engines 500 obtained artifacts in this example including text extracted from the word document, a macro embedded in the document, information about an image included in the document, among other information. The macro information section 802, for example, illustrates macro code extracted from the document by the file analysis engines 500. In some examples, the information displayed about an identified macro can include information obtained based at least in part on an emulated execution of some or all the macro code included in the document, where the original macro code may, for example, have been partially obfuscated in an attempt to avoid detection.

As indicated, as new objects such as URLs or files are detected by a threat analysis platform 100 during analysis of an initially provided object, the threat analysis platform 100 can optionally "reinject" or resubmit the newly detected objects for additional analysis. Similar to operation of the web analyzer engine 128 and its process for following URLs, the threat analysis platform 100 includes functionality to prioritize the reinjection of certain objects detected during analysis and to determine when to cease further analysis of identified objects. The reinjection of various types of objects during such analyses can be considered a form of "attack chain" following, referring to the way in which some security threats can involve a multi-step process across multiple types of objects. For example, one type of security threat might begin with an email including a document attachment, where the document includes a hyperlink leading to a website at which a malicious executable is downloaded upon selection of an interface element. In this example, the document attachment and the website hosting the malicious executable may appear to be relatively benign in isolation; however, the entire chain of actions leading to the malicious executable may represent an attack chain designed by attackers to thwart detection by security products. Based on a historical analysis of such security threats, certain patterns of objects and object types are more likely to be associated with security threats than others. The threat analysis platform 100 thus can prioritize the analysis of object patterns matching an attack chain rule set identifying object patterns commonly associated with security threats.

Figure 9:
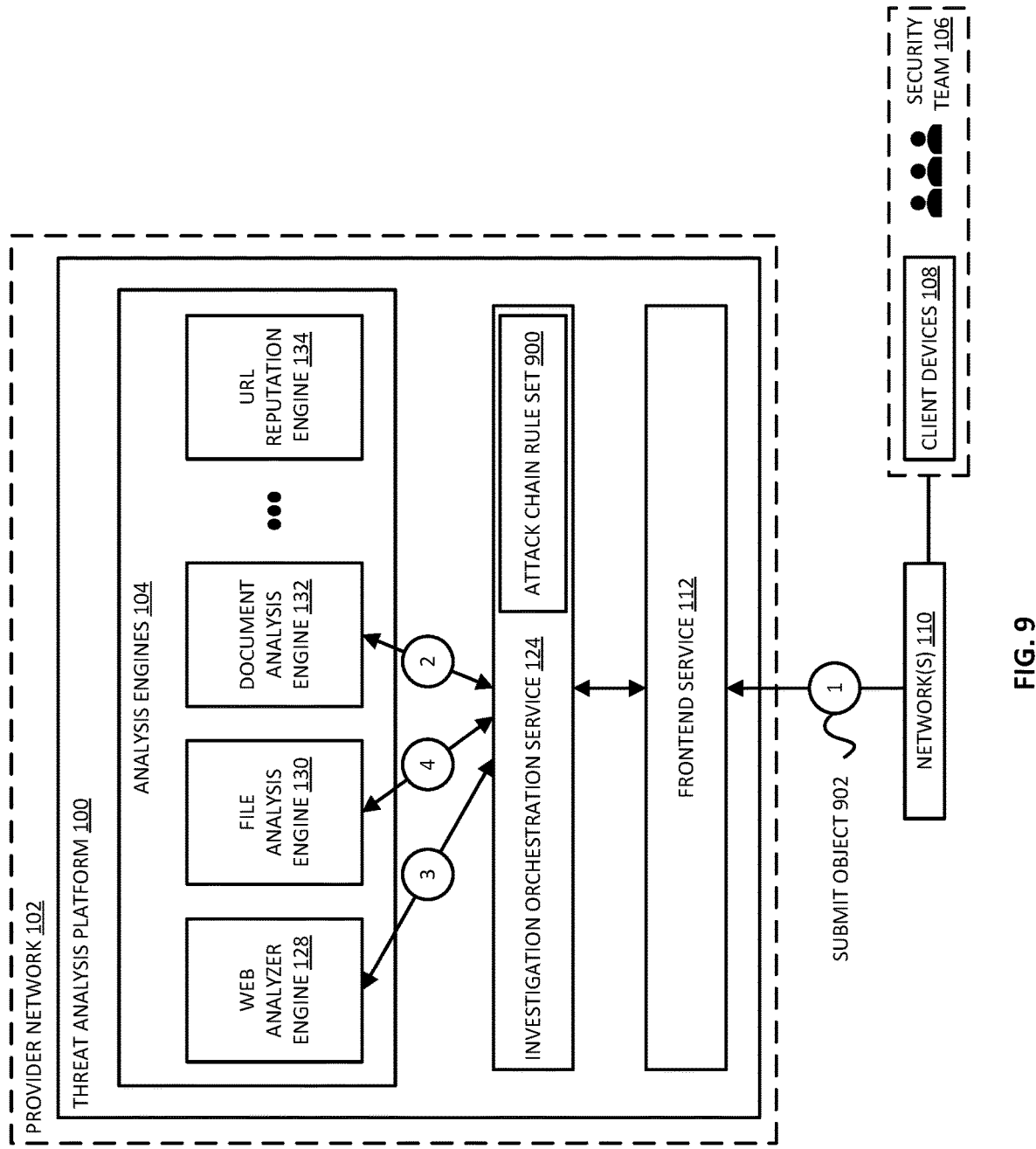
FIG. 9 is a diagram illustrating additional details of an attack chain following process performed by a threat analysis platform according to some examples.

FIG. 9 is a diagram illustrating additional details of an attack chain following process performed by a threat analysis platform 100 according to some examples. The numbered circles "1"-4" in FIG. 9 illustrate a process in which the threat analysis platform 100 is provided an initial object (e.g., a URL), provides the object to a first analysis engine of a plurality of analysis engines 104, obtains a second object identified during analysis of the first object, determines whether to investigate the second object based on an attack chain rule set 900 identifying common patterns of object types associated with security threats, providing the second object to a second analysis engine. In general, the threat analysis platform 100 can continue to investigate any number of objects deriving from an initial object (and deriving from those downstream objects) according to an attack chain rule set 900 until the platform 100 determines to cease the investigation. For example, at circle "1," a user or application submits 902 an object to the threat analysis platform 100 for analysis in a manner similar to the other processes described herein.

At circle "2," in the example of FIG. 9, the investigation orchestration service 124 initially submits the provided object to a document analysis engine 132. For example, the investigation orchestration service 124 may have determined that the object is a word processing document that had been included as an email attachment or obtained from another source. In this example, the document analysis service extracts artifacts from the object including the identification of a URL included in the document. Upon obtaining the URL from the document analysis engines 132, the investigation orchestration service 124 determines, based on the attack chain rule set 900 identifying patterns of object types associated with security threats, to investigate the URL. For example, based on historical data indicating a prevalence of security threats that begin with a document object containing a URL leading to a malicious website, the attack chain rule set 900 can identify that pattern of objects as one worthy of investigation.

At circle "3," based on the determination to investigate the URL, the investigation orchestration service 124 provides the URL to the web analyzer engine 128. As indicated herein, the web analyzer engine 128 can perform several actions relative to the URL including causing an instrumented browser to navigate to the URL, obtaining and extracting artifacts associated with a resource located at the URL, following additional URLs associated with the resource, and the like. In this example, the web analyzer engine 128 downloads an executable file during the analysis of the provided URL. The investigation orchestration service 124 again uses the attack chain rule set 900 to determine whether the current pattern of objects (e.g., a word processing document leading to a URL leading to an executable file) is a pattern of object types worthy of investigation. In this example, the investigation orchestration service 124 determines to analyze the file and, at circle "4," provides the file to the file analysis engine 130. As indicated, this process can continue as additional objects are identified by the analysis engines and the attack chain rule set 900 indicates that the pattern of object types is one worthy of additional investigation. In the example of FIG. 9, the attack chain involves processing a chain of different object types and involving different types of analysis engines. An attack chain can generally involve any combination of object types and engines (e.g., a URL proceeding to another URL proceeding to a file, or a file proceeding to a URL proceeding to another file, and so forth).

In example of FIG. 9, the file analysis engine 130 may identify one or more additional objects (e.g., additional URLs, images, etc.) that are provided to the investigation orchestration service 124 and, based on the attack chain rule set, the investigation orchestration service 124 determines to cease the investigation because the pattern no longer represents a common attack chain pattern. In this manner, the investigation orchestration service 124 can bound investigations that may otherwise proceed indefinitely as new objects are discovered over the course of investigating other objects. In some examples, the investigation orchestration service 124 can determine whether to investigate additional objects based on the attack chain rule set 900 in combination with other information such as, for example, types of artifacts identified by preceding analysis engines, a risk score assigned to previously analyzed objects or corresponding artifacts, a total number of objects already analyzed, user preferences indicating a maximum attack chain depth, among other possible information.

FIG. 10 is a flow diagram illustrating operations of a method in which a threat analysis platform uses a web analyzer engine to analyze a provided URL and associated resources for security-related threats according to some examples. FIG. 11 is a flow diagram illustrating operations of a method in which a threat analysis platform uses one or more file analysis engines to analyze a provided document or other type of file for security-related threats according to some examples. FIG. 12 is a flow diagram illustrating operations of a method in which a threat analysis platform automates the analysis of a security-related threat by following an attack chain involving multiple different types of objects according to some examples.

The example process 1000, process 1100, and process 1200, can each be implemented, for example, by a computing device that comprises a processor and a non-transitory computer-readable medium. The non-transitory computer readable medium can be storing instructions that, when executed by the processor, can cause the processor to perform the operations of the illustrated processes. Alternatively or additionally, the processes can be implemented using a non-transitory computer-readable medium storing instructions that, when executed by one or more processors, case the one or more processors to perform the operations of the processes of FIG. 10, FIG. 11, and FIG. 12.

The process 1000 includes, at block 1002, obtaining, by a web analyzer engine of a threat analysis platform, a first Uniform Resource Link (URL) to be analyzed by the web analyzer engine for potential security threats.

The process 1000 further includes, at block 1004, causing a web browser to navigate to a first resource located at the first URL.

The process 1000 further includes, at block 1006, identifying a plurality of artifacts associated with the first resource, wherein the plurality of artifacts includes a plurality of interactive interface elements.

The process 1000 further includes, at block 1008, assigning, to the plurality of interactive interface elements, a plurality of interaction scores, wherein each interaction score of the plurality of interaction scores indicates a predicted relevance of a respective interactive interface element of the plurality of interactive interface elements to a security investigation.

The process 1000 further includes, at block 1010, causing the web browser to interact with one of the plurality of interactive interface elements based on a ranking of the plurality of interaction scores.

In some examples, the process 1000 further includes generating an interaction score of the plurality of interaction scores based at least in part on an analysis of text displayed in connection with a corresponding interactive interface element.

In some examples, the first resource is a web page, and the process 1000 further includes: determining a location at which an interactive interface element of the plurality of interactive interface elements is displayed on the web page; determining a size of the interactive interface element displayed on the web page; and generating an interaction score of the plurality of interaction scores based at least in part on the location at which the interactive interface element is displayed on the web page and the size of the interactive interface element displayed on the web page.

In some examples, the process 1000 further includes generating an interaction score of the plurality of interaction scores based on an analysis of a URL associated with a corresponding interactive interface element.

In some examples, the plurality of interactive interface elements is a first plurality of interactive interface elements, wherein the plurality of interaction scores is a first plurality of interaction scores, and the process 1000 further includes: identifying a second plurality of interactive interface elements associated with the second resource; assigning, to the second plurality of interactive interface elements, a second plurality of interaction scores; combining the second plurality of interactive interface elements with the first plurality of interactive interface elements to obtain a third plurality of interactive interface elements; determining that none of the interactive interface elements of the third plurality of interactive interface elements exceeds a threshold value; and ceasing investigation of additional URLs.

In some examples, the process 1000 further includes launching the web browser in an isolated computing environment using a computing resource provided by a cloud provider network, wherein the computing resources is at least one of: a virtual machine, or a container.

In some examples, the web browser includes functionality that causes the web browser to identify the plurality of artifacts associated with the first resource, wherein the functionality further causes the web browser to generate artifacts associated with navigating to the first resource, and wherein the artifacts associated with navigating the first resource include at least one of: identifiers of domain names or Internet Protocol (IP) addresses accessed, file metadata, HTTP transactions, or IP-based geolocation information.

In some examples, the process 1000 further includes determining, based on a rule of a rule set managed by the web analyzer engine, that a combination of artifacts from the plurality of artifacts represents a potential security threat; assigning, based on the rule, a risk score to the combination of artifacts; and causing display of a detection representing the combination of artifacts and the risk score.

In some examples, the process 1000 further includes causing display of a hierarchical display of URLs accessed by the web browser responsive to analysis of the first URL, wherein the hierarchical display includes an association between the first URL and the one of the plurality of second URLs.

In some examples, the first URL is a first type of object, and wherein the process 1000 further includes: identifying a second type of object associated with the first resource located at the first URL, wherein the second type of object is a file; and providing the file to a file analysis engine of the threat analysis platform for analysis, wherein the file analysis engine assigns a risk score to the file.

In FIG. 11, the process 1100 includes, at block 1102, obtaining, by a file analysis engine of a threat analysis platform, a file to be analyzed for one or more security threats associated with the file.

The process 1100 further includes, at block 1104, determining a type of the file.

The process 1100 further includes, at block 1106, identifying, based on the type of the file, a plurality of file type-specific actions to be used to extract a plurality of artifacts from the file, wherein the plurality of file type-specific actions includes extracting macro code or encoded instructions from the file.

The process 1100 further includes, at block 1108, emulating execution of at least a portion of the macro code or encoded instructions to obtain an artifact of the plurality of artifacts.

The process 1100 further includes, at block 1110, assigning, based on a rule set, respective risk scores to two or more artifacts of the plurality of artifacts including the artifact obtained based on emulating execution of at least a portion of the macro code or encoded instructions.

The process 1100 further includes, at block 1112, assigning, based on the respective risk scores, an aggregated risk score for the file.

In some examples, the process 1100 further includes causing display of a graphical user interface (GUI) including information about the plurality of artifacts and the aggregated risk score.

In some examples, the process 1100 further includes determining, by the file analysis engine, that the file is encrypted; and decrypting the file prior to perform the file-type specific actions.

In some examples, the process 1100 further includes identifying, by the file analysis engine, a Quick Response (QR) code included in the file; analyzing the QR code to identify a URL associated with the QR code; causing a web browser to navigate to a resource located at the URL; and obtaining at least one artifact of the plurality of artifacts from the resource located at the URL.

In some examples, the file analysis engine emulates execution of at least a portion of the macro code or encoded instructions in a computing environment launched using a computing resource provided by a cloud provider network, and wherein the computing resource is one of: a virtual machine, or a container.

In some examples, the file is an image file, and wherein the process 1100 further includes: generating a perceptual hash based on the image file, wherein the perceptual hash is an artifact of the plurality of artifacts; comparing the perceptual hash against a database of hash values associated with malicious image files; and assigning a risk score to the perceptual hash based on comparing the perceptual hash against the database of hash values.

In some examples, the file is an image file, and the process 1100 further includes: using a machine learning model to identify a visual element included in the image file, wherein the visual element is an artifact of the plurality of artifacts; and assigning, based on the rule set, a risk score to at least one of: the visual element, or a combination of the visual element and another artifact of the plurality of artifacts.

In some examples, the process 1100 further includes using optical character recognition (OCR) identify text displayed by the file, wherein at least a portion of the text is an artifact of the plurality of artifacts; and assigning, based on the rule set, a risk score to the at least portion of the text.

In some examples, the process 1100 further includes identifying a Uniform Resource Locator (URL) in the file; and providing the URL to a web analyzer engine to be analyzed by the web analyzer engine for potential security threats.

In some examples, the process 1100 further includes determining, based on a rule from the rule set managed by the file analysis engine, that a combination of artifacts from the plurality of artifacts represents a potential security threat; assigning, based on the rule, a risk score to the combination of artifacts; and causing display of a detection representing the combination of artifacts and the risk score.

In some examples, the file is a first file, wherein an artifact of the plurality of artifacts is a second file embedded in the first file, and wherein the method further comprises providing the second file to the file analysis engine to be analyzed for one or more security threats associated with the second file.

In FIG. 12, the process 1200 includes, at block 1202, obtaining, by a threat analysis platform including a plurality of analysis engines, a first object to be investigated for security-related threats, wherein the first object is one of: a Uniform Resource Locator (URL) or a file.

The process 1200 further includes, at block 1204, providing, based on a type of the first object, the first object to a first analysis engine of the plurality of analysis engines, wherein the first analysis engine identifies a second object during analysis of the first object, and wherein the first object is associated with a first object type and the second object is associated with a second object type that is different from the first object type.

The process 1200 further includes, at block 1206, determining, based on a rule set identifying patterns of object types associated with security threats, to investigate the second object.

The process 1200 further includes, at block 1208, providing the second object to a second analysis engine of the plurality of analysis engines.

In some examples, the process 1200 further includes identifying, by the second analysis engine, a third object associated with a third object type; determining, based on the rule set and the third object type, to investigate the third object; and providing the third object to an analysis engine of the plurality of analysis engines.

In some examples, the process 1200 further includes identifying, by the second analysis engine, a third object associated with a third object type; and determining, based on the rule set and the third object type, not to investigate the third object.

In some examples, the first object is a document and wherein the second object is a URL, and wherein the rule set includes a pattern indicating URLs derived from documents are commonly associated with security threats.

In some examples, the first analysis engine and the second analysis engine generate a plurality of risk scores associated with artifacts derived from the first object and the second object, and the process 1200 further includes causing display of a graphical user interface (GUI) including the plurality of risk scores.

In some examples, the process 1200 further includes receiving, by an investigation orchestration service of the threat analysis platform, an application programming interface (API) request to investigate the first object for potential security threats, wherein the investigation orchestration service provides the first object to the first analysis engine and the second object to the second analysis engine.

In some examples, the first analysis engine identifies a plurality of artifacts associated with the first object, and wherein the first analysis engine assigns a risk score to a combination of artifacts from the plurality of artifacts.

In some examples, the process 1200 further includes causing display of a graphical user interface (GUI) including a hierarchical representation of objects analyzed by the threat analysis platform, wherein the hierarchical representation includes a visual indication of a relationship between the first object and the second object.

In some examples, the process 1200 further includes launching, by an investigation orchestration service of the threat analysis platform, the first analysis engine in an isolated computing environment using a computing resource provided by a cloud provider network, wherein the isolated computing environment includes at least one of: a container provided by a container orchestration service, or a virtual machine provided by a compute service.

In some examples, the process 1200 further includes obtaining, from the first analysis engine and the second analysis engine, a risk score associated with the first object or the second object; and providing the risk score to an external application.

In some examples, the process 1200 further includes sending, by the first analysis engine, the first object to an external security service to obtain a risk score for the first object, and wherein the first analysis engine generates an aggregate risk score for the first object based at least in part on the risk score obtained from the external security service.

Implementation Mechanism—Hardware Overview

According to one example, the techniques described herein are implemented by one or more special-purpose computing devices. The special-purpose computing devices may be desktop computer systems, portable computer systems, handheld devices, networking devices or any other device that incorporates hard-wired and/or program logic to implement the techniques. The special-purpose computing devices may be hard-wired to perform the techniques or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination thereof. Such special-purpose computing devices may also combine custom hard-wired logic, ASICs, or FPGAs with custom programming to accomplish the techniques.

Figure 13:
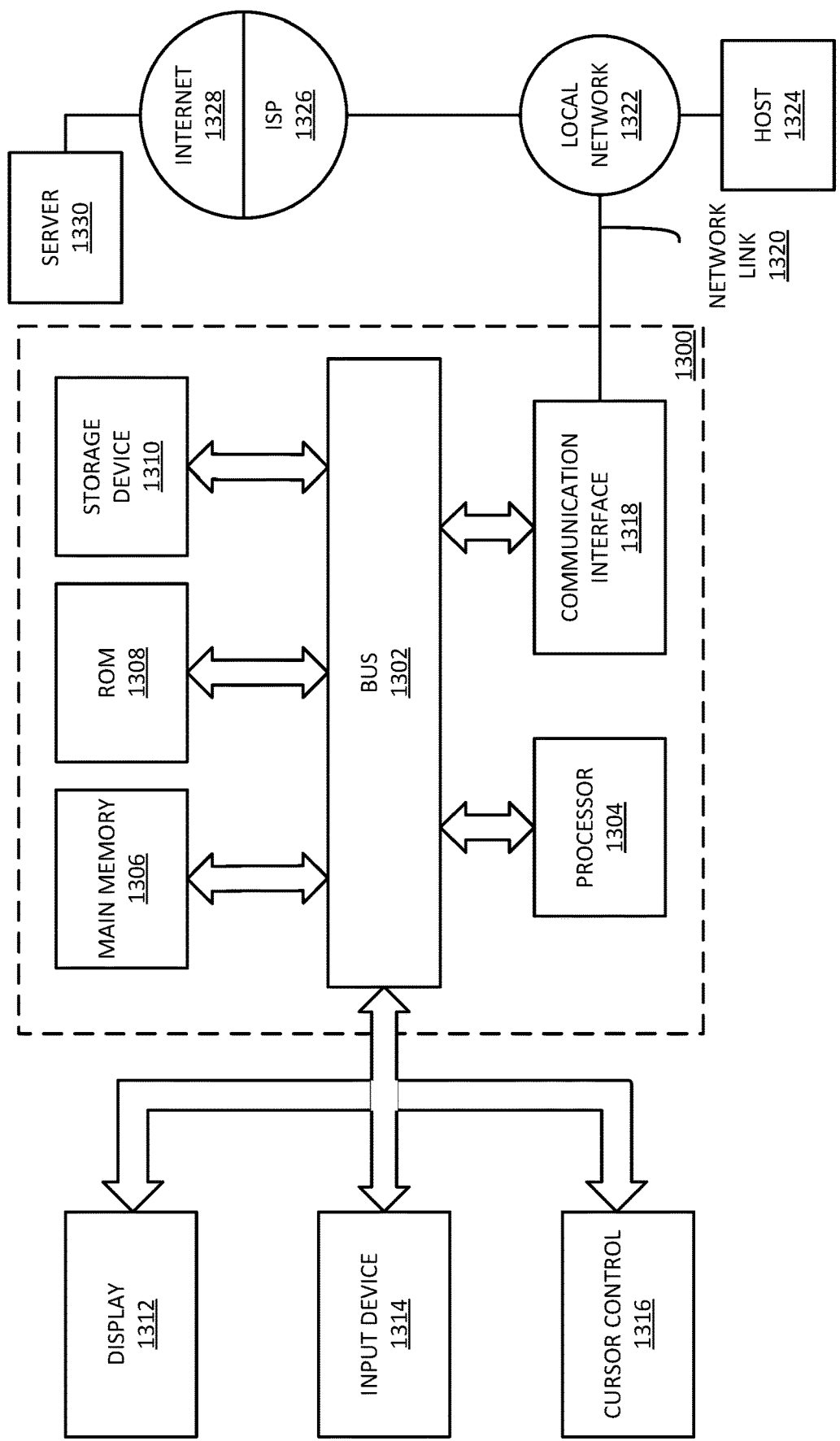
FIG. 13 is a block diagram illustrating an example computer system that may be used in some examples.

FIG. 13 is a block diagram that illustrates a computer system 1300 utilized in implementing the above-described techniques, according to an example. Computer system 1300 may be, for example, a desktop computing device, laptop computing device, tablet, smartphone, server appliance, computing mainframe, multimedia device, handheld device, networking apparatus, or any other suitable device.

Computer system 1300 includes one or more buses 1302 or other communication mechanism for communicating information, and one or more hardware processors 1304 coupled with buses 1302 for processing information. Hardware processors 1304 may be, for example, general purpose microprocessors. Buses 1302 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 1300 also includes a main memory 1306, such as a random access memory (RAM) or other dynamic or volatile storage device, coupled to bus 1302 for storing information and instructions to be executed by processor 1304. Main memory 1306 also may be used for storing temporary variables or other intermediate information during execution of instructions to be executed by processor 1304. Such instructions, when stored in non-transitory storage media accessible to processor 1304, render computer system 1300 a special-purpose machine that is customized to perform the operations specified in the instructions.

Computer system 1300 further includes one or more read only memories (ROM) 1308 or other static storage devices coupled to bus 1302 for storing static information and instructions for processor 1304. One or more storage devices 1310, such as a solid-state drive (SSD), magnetic disk, optical disk, or other suitable non-volatile storage device, is provided and coupled to bus 1302 for storing information and instructions.

Computer system 1300 may be coupled via bus 1302 to one or more displays 1312 for presenting information to a computer user. For instance, computer system 1300 may be connected via an High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 1312 may include, without limitation, plasma display devices, projectors, cathode ray tube (CRT) monitors, electronic paper, virtual reality headsets, braille terminal, and/or any other suitable device for outputting information to a computer user. In an example, any suitable type of output device, such as, for instance, an audio speaker or printer, may be utilized instead of a display 1312.

One or more input devices 1314 are coupled to bus 1302 for communicating information and command selections to processor 1304. One example of an input device 1314 is a keyboard, including alphanumeric and other keys. Another type of user input device 1314 is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane. Yet other examples of suitable input devices 1314 include a touch-screen panel affixed to a display 1312, cameras, microphones, accelerometers, motion detectors, and/or other sensors. In an example, a network-based input device 1314 may be utilized. In such an example, user input and/or other information or commands may be relayed via routers and/or switches on a Local Area Network (LAN) or other suitable shared network, or via a peer-to-peer network, from the input device 1314 to a network link 1320 on the computer system 1300.

A computer system 1300 may implement techniques described herein using customized hard-wired logic, one or more ASICs or FPGAs, firmware and/or program logic which in combination with the computer system causes or programs computer system 1300 to be a special-purpose machine. According to one example, the techniques herein are performed by computer system 1300 in response to processor 1304 executing one or more sequences of one or more instructions contained in main memory 1306. Such instructions may be read into main memory 1306 from another storage medium, such as storage device 1310. Execution of the sequences of instructions contained in main memory 1306 causes processor 1304 to perform the process steps described herein. In alternative examples, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1310. Volatile media includes dynamic memory, such as main memory 1306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1302. Transmission media can also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or a solid state drive of a remote computer. The remote computer can load the instructions into its dynamic memory and use a modem to send the instructions over a network, such as a cable network or cellular network, as modulate signals. A modem local to computer system 1300 can receive the data on the network and demodulate the signal to decode the transmitted instructions. Appropriate circuitry can then place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

A computer system 1300 may also include, in an example, one or more communication interfaces 1318 coupled to bus 1302. A communication interface 1318 provides a data communication coupling, typically two-way, to a network link 1320 that is connected to a local network 1322. For example, a communication interface 1318 may be an integrated services digital network (ISDN) card, cable modem, satellite modem, or a modem to provide a data communication connection to a corresponding type of telephone line. As another example, the one or more communication interfaces 1318 may include a local area network (LAN) card to provide a data communication connection to a compatible LAN. As yet another example, the one or more communication interfaces 1318 may include a wireless network interface controller, such as a 802.11-based controller, Bluetooth controller, Long Term Evolution (LTE) modem, and/or other types of wireless interfaces. In any such implementation, communication interface 1318 sends and receives electrical, electromagnetic, or optical signals that carry digital data streams representing various types of information.

Network link 1320 typically provides data communication through one or more networks to other data devices. For example, network link 1320 may provide a connection through local network 1322 to a host computer 1324 or to data equipment operated by a Service Provider 1326. Service Provider 1326, which may for example be an Internet Service Provider (ISP), in turn provides data communication services through a wide area network, such as the world wide packet data communication network now commonly referred to as the "Internet" 1328. Local network 1322 and Internet 1328 both use electrical, electromagnetic, or optical signals that carry digital data streams. The signals through the various networks and the signals on network link 1320 and through communication interface 1318, which carry the digital data to and from computer system 1300, are example forms of transmission media.

In an example, computer system 1300 can send messages and receive data, including program code and/or other types of instructions, through the network(s), network link 1320, and communication interface 1318. In the Internet example, a server 1330 might transmit a requested code for an application program through Internet 1328, ISP 1326, local network 1322 and communication interface 1318. The received code may be executed by processor 1304 as it is received, and/or stored in storage device 1310, or other non-volatile storage for later execution. As another example, information received via a network link 1320 may be interpreted and/or processed by a software component of the computer system 1300, such as a web browser, application, or server, which in turn issues instructions based thereon to a processor 1304, possibly via an operating system and/or other intermediate layers of software components.

In an example, some or all of the systems described herein may be or comprise server computer systems, including one or more computer systems 1300 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In an example, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an example, the cloud-based components may be implemented by third-party entities, on behalf of another entity for whom the components are deployed. In other examples, however, the described systems may be implemented entirely by computer systems owned and operated by a single entity. In an example, an apparatus comprises a processor and is configured to perform any of the foregoing methods. In an example, a non-transitory computer readable storage medium, storing software instructions, which when executed by one or more processors cause performance of any of the foregoing methods.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

What is claimed is:

1. A computer-implemented method comprising:
   obtaining, by a threat analysis platform including a plurality of analysis engines, a first object to be investigated for security-related threats, wherein the first object is one of: a Uniform Resource Locator (URL) or a file;
   providing, based on a type of the first object, the first object to a first analysis engine of the plurality of analysis engines, wherein the first analysis engine identifies a second object during analysis of the first object, and wherein the first object is associated with a first object type and the second object is associated with a second object type that is different from the first object type;
   determining, based on a rule set identifying patterns of object types associated with security threats and a plurality of risk scores associated with artifacts derived from the first object and the second object, to investigate the second object; and
   providing the second object to a second analysis engine of the plurality of analysis engines.

2. The method of claim 1, further comprising:
   identifying, by the second analysis engine, a third object associated with a third object type;
   determining, based on the rule set and the third object type, to investigate the third object; and
   providing the third object to an analysis engine of the plurality of analysis engines.

3. The method of claim 1, further comprising:
   identifying, by the second analysis engine, a third object associated with a third object type; and
   determining, based on the rule set and the third object type, not to investigate the third object.

4. The method of claim 1, wherein the first object is a document and wherein the second object is a URL, and wherein the rule set includes a pattern indicating URLs derived from documents are commonly associated with security threats.

5. The method of claim 1, wherein the first analysis engine and the second analysis engine generate the plurality of risk scores associated with the artifacts derived from the first object and the second object, and wherein the method further comprises causing display of a graphical user interface (GUI) including the plurality of risk scores.

6. The method of claim 1, further comprising receiving, by an investigation orchestration service of the threat analysis platform, an application programming interface (API) request to investigate the first object for potential security threats, wherein the investigation orchestration service provides the first object to the first analysis engine and the second object to the second analysis engine.

7. The method of claim 1, wherein the first analysis engine identifies a plurality of artifacts associated with the first object, and wherein the first analysis engine assigns a risk score to a combination of artifacts from the plurality of artifacts.

8. The method of claim 1, further comprising causing display of a graphical user interface (GUI) including a hierarchical representation of objects analyzed by the threat analysis platform, wherein the hierarchical representation includes a visual indication of a relationship between the first object and the second object.

9. The method of claim 1, further comprising launching, by an investigation orchestration service of the threat analysis platform, the first analysis engine in an isolated computing environment using a computing resource provided by a cloud provider network, wherein the isolated computing environment includes at least one of: a container provided by a container orchestration service, or a virtual machine provided by a compute service.

10. The method of claim 1, further comprising:
obtaining, from the first analysis engine and the second analysis engine, a risk score associated with the first object or the second object; and
providing the risk score to an external application.

11. The method of claim 1, further comprising sending, by the first analysis engine, the first object to an external security service to obtain a risk score for the first object, and wherein the first analysis engine generates an aggregate risk score for the first object based at least in part on the risk score obtained from the external security service.

12. A computing device, comprising:
a processor; and
a non-transitory computer-readable medium having stored thereon instructions that, when executed by the processor, cause the processor to perform operations including:
obtaining, by a threat analysis platform including a plurality of analysis engines, a first object to be investigated for security-related threats, wherein the first object is one of: a Uniform Resource Locator (URL) or a file;
providing, based on a type of the first object, the first object to a first analysis engine of the plurality of analysis engines, wherein the first analysis engine identifies a second object during analysis of the first object, and wherein the first object is associated with a first object type and the second object is associated with a second object type that is different from the first object type;
determining, based on a rule set identifying patterns of object types associated with security threats and a plurality of risk scores associated with artifacts derived from the first object and the second object, to investigate the second object; and
providing the second object to a second analysis engine of the plurality of analysis engines.

13. The computing device of claim 12, wherein the instructions, when executed by the processor, further cause the processor to perform operations including:
identifying, by the second analysis engine, a third object associated with a third object type;
determining, based on the rule set and the third object type, to investigate the third object;
providing the third object to an analysis engine of the plurality of analysis engines.

14. The computing device of claim 12, wherein the instructions, when executed by the processor, further cause the processor to perform operations including:
identifying, by the second analysis engine, a third object associated with a third object type; and
determining, based on the rule set and the third object type, not to investigate the third object.

15. The computing device of claim 12, wherein the first object is a document and wherein the second object is a URL, and wherein the rule set includes a pattern indicating URLs derived from documents are commonly associated with security threats.

16. The computing device of claim 12, wherein the first analysis engine and the second analysis engine generate the plurality of risk scores associated with the artifacts derived from the first object and the second object, and wherein the instructions, when executed by the processor, further cause the processor to perform operations including causing display of a graphical user interface (GUI) including the plurality of risk scores.

17. A non-transitory computer-readable medium having stored thereon instructions that, when executed by one or more processors, cause the one or more processor to perform operations including:
obtaining, by a threat analysis platform including a plurality of analysis engines, a first object to be investigated for security-related threats, wherein the first object is one of: a Uniform Resource Locator (URL) or a file;
providing, based on a type of the first object, the first object to a first analysis engine of the plurality of analysis engines, wherein the first analysis engine identifies a second object during analysis of the first object, and wherein the first object is associated with a first object type and the second object is associated with a second object type that is different from the first object type;
determining, based on a rule set identifying patterns of object types associated with security threats and a plurality of risk scores associated with artifacts derived from the first object and the second object, to investigate the second object; and
providing the second object to a second analysis engine of the plurality of analysis engines.

18. The non-transitory computer-readable medium of claim 17, wherein the instructions, when executed by the processor, further cause the processor to perform operations including:
identifying, by the second analysis engine, a third object associated with a third object type;
determining, based on the rule set and the third object type, to investigate the third object;
providing the third object to an analysis engine of the plurality of analysis engines.

19. The non-transitory computer-readable medium of claim 17, wherein the instructions, when executed by the processor, further cause the processor to perform operations including:
identifying, by the second analysis engine, a third object associated with a third object type; and
determining, based on the rule set and the third object type, not to investigate the third object.

20. The non-transitory computer-readable medium of claim 17, wherein the first object is a document and wherein the second object is a URL, and wherein the rule set includes a pattern indicating URLs derived from documents are commonly associated with security threats.

* * * * *